United States Patent
Takahashi et al.

(10) Patent No.: US 8,358,442 B2
(45) Date of Patent: Jan. 22, 2013

(54) IMAGE PROCESSING DEVICE AND IMAGE PROCESSING PROGRAM

(75) Inventors: Toshiyuki Takahashi, Tokyo (JP); Atsushi Hori, Tokyo (JP); Yuka Fujita, Tokyo (JP); Koichi Hiramatsu, Tokyo (JP); Takeo Kawaura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 836 days.

(21) Appl. No.: 12/446,348

(22) PCT Filed: Nov. 16, 2006

(86) PCT No.: PCT/JP2006/322868
§ 371 (c)(1),
(2), (4) Date: Apr. 20, 2009

(87) PCT Pub. No.: WO2008/059575
PCT Pub. Date: May 22, 2008

(65) Prior Publication Data
US 2011/0007361 A1 Jan. 13, 2011

(51) Int. Cl.
*H04N 1/40* (2006.01)
*G06F 3/12* (2006.01)
(52) U.S. Cl. ........................ 358/3.02; 358/1.1
(58) Field of Classification Search ............... 358/1.1, 358/1.8, 1.9, 3.02, 1.13, 1.14, 1.15, 1.17, 358/1.18; 347/14, 15; 382/197
See application file for complete search history.

(56) References Cited

U.S. PATENT DOCUMENTS

| | | | | |
|---|---|---|---|---|
| 5,206,719 A | * | 4/1993 | Ikeda et al. | 358/518 |
| 5,241,372 A | | 8/1993 | Ohba | |
| 5,550,638 A | * | 8/1996 | Ikeda et al. | 358/296 |
| 5,617,224 A | * | 4/1997 | Ichikawa et al. | 358/530 |
| 5,748,798 A | | 5/1998 | Nakai et al. | |
| 6,118,547 A | * | 9/2000 | Tanioka | 358/1.9 |

FOREIGN PATENT DOCUMENTS

| | | |
|---|---|---|
| JP | 3-252696 A | 11/1991 |
| JP | 4-205573 A | 7/1992 |
| JP | 5-261972 A | 10/1993 |
| JP | 6-152932 A | 5/1994 |
| JP | 7-199903 A | 8/1995 |
| JP | 10-83176 A | 3/1998 |
| WO | WO-2006/123422 A1 | 11/2006 |

\* cited by examiner

*Primary Examiner* — Gabriel Garcia
(74) *Attorney, Agent, or Firm* — Birch, Stewart, Kolasch & Birch, LLP

(57) ABSTRACT

An image processing device includes a multiplier 1 for multiplying a pixel signal P(x) by a weighting factor $\alpha 0$ ($0 \leq \alpha 0 \leq 1$), a delay element 2 for delaying the pixel signal P(x) which has not been multiplied yet by the weighting factor $\alpha 0$ by the multiplier 1 by one pixel, and a multiplier 3 for multiplying the pixel signal P(x−1) delayed by the delay element 2 by a weighting factor $\alpha 1$ ($0 \leq \alpha 1 \leq 1$), the total sum of the weighting factors $\alpha 0$ and $\alpha 1$ being larger than 1 and smaller than an upper limit $\alpha$max. An adder 4 adds the multiplication result $\alpha 0 \cdot P(x)$ of the multiplier 1 and the multiplication result $\alpha 1 \cdot P(x-1)$ of the multiplier 3, and a limiter 5 limits the addition result P'(x) of the adder 4 in such a way that P'(x) falls within a maximum density value Pmax.

17 Claims, 16 Drawing Sheets

(a)

(b)

(c)

(d)

(e)

(f)

(a)

(b)

(c)

(d)

Before Bold     Horizontal Shift by One Pixel     After Bold
(Superimposing)

IMAGE PROCESSING DEVICE AND IMAGE PROCESSING PROGRAM

FIELD OF THE INVENTION

The present invention relates to an image processing device and an image processing program for performing bold processing of fattening characters and a line drawing.

BACKGROUND OF THE INVENTION

A conventional image processing device implements bold processing by adding image data about an image in which an original image is shifted on a dot basis to the original image data.

FIG. 20 is an explanatory drawing showing bold processing with superimposing.

When performing the bold processing, the conventional image processing device typically uses a method of shifting image data in the form of bit map in a lateral direction or in a longitudinal direction, as shown in FIG. 20, and then superimposing those image data to print out an image.

An example which is an extension of this method using superimposing is disclosed by, for example, the following patent reference 1.

In the method currently disclosed by the following patent reference 1, bold processing is performed on the image and printing is then performed after the one-pixel-width perimeter of the image is fattened through digital image processing.

However, because simple fattening of the one-pixel-width perimeter by one dot causes a difference in the balance of characters between before and after the bold processing, the one-pixel-width perimeter is fattened through the digital image processing in such a way that the balance of characters can be achieved between before and after the bold processing.

In both of the method using superimposing and the method disclosed by above-mentioned patent reference 1, how to bold a character spatially through image processing is a key factor, and what is necessary after holding a character spatially through image processing is basically to simply print out the character using a printer.

Because such a printer is generally a dot impact printer which outputs monochrome binary values, it can be assumed to simply print a dot or not from the viewpoint of a micro level at the time of printing.

Recently, multiple gradation printers which can express a ternary or higher value have been produced commercially, and there have been increasing cases of, when producing a display output, displaying a character image using a multiple gradation display. Taking these recent trends into consideration, it is necessary to assume, as an output device, a multiple gradation of three or more steps.

Hereafter, a case of outputting a character image with a multiple gradation in a method with superimposing which is the most fundamental method of bold processing will be considered as follows. In this case, for the sake of simplicity, assuming that a character image has only one dimension, and when the density value of a pixel at a position x is expressed as P(x) and the density value of a pixel preceding the pixel at the position x by one pixel is expressed as P(x−1), and P(x)=0 shows white and P(x)=Pmax (a maximum density value) shows black, the density value P'(x) of the pixel which is bold-processed is shown by the following expression (1).

$$P'(x)=P(x)+P(x-1)$$

when $P'(x)>=P\text{max}$, $$P'(x)=P\text{max} \quad (1)$$

FIG. 21 is a configuration diagram showing a conventional image processing device. This conventional image processing device carries out bold processing according to the above-mentioned expression (1) to calculate the bold-processed density value P'(x).

In FIG. 21, in order to acquire the density value P(x−1) of the pixel preceding the pixel at the position x by one pixel, a delay means 2101 delays the pixel signal by one pixel, an addition means 2102 adds the density value P(x) of the pixel of the inputted pixel signal and the density value P(x−1) of the pixel preceding the pixel at the position x by one pixel, and a limiter means 2103 limits the addition result of the addition means 2102 to a value equal to or smaller than the maximum density value Pmax, as shown in the expression (1).

In the conventional bold processing with superimposing, and the conventional bold processing of fattening a perimeter portion of a character image, the bold-processed pixel is uniquely determined from the inputted pixel signal according to the expression (1).

In this case, in order to adjust the weight of a character, there's no other choice but to increase the number of adjacent pixels to be referred to make spatial expansion of the character, though when outputting the character image to a multiple gradation printer or a multiple gradation display, it is possible to adjust the weight of the character in appearance using the multiple gradation.

However, because the pixel value is uniquely determined according to the method shown by the expression (1), as mentioned above, there arises a problem of being unable to perform any adjustment of the weight of a character in spite of using an output device which can originally perform fine weight control on the character by controlling the gradation.

Another problem is that a character deformation easily occurs in a case of using an output device having low resolution, such as a display, and in a case of displaying a character font having a small number of points or a character font having a large number of pixels.

FIG. 22 is an explanatory drawing showing a character deformation in the bold processing.

Especially, FIG. 22(*a*) shows the density value P(x) of a pixel at a position x of a pixel signal inputted, FIG. 22(*b*) shows the density value P(x) of the pixel and the density value P(x−1) of a pixel preceding the pixel at the position x by one pixel, and FIG. 22(*c*) shows the result of the addition of the density value P(x) and the density value P(x−1), which is obtained by the addition means 2102.

FIG. 22(*d*) shows the result of a limiter process which is performed on the addition result shown in FIG. 22(*c*) by the limiter means 2103. Because the density value P'(x) exceeds the maximum density value Pmax, the density value is limited to the maximum density value Pmax.

A portion shown by a mark ✗ of FIG. 22(*a*) is fully deformed to be black-colored in FIG. 22(*d*), as can also be seen from FIG. 22(*d*).

FIGS. 22(*e*) to 22(*g*) show an example of two gradation data. FIG. 22(*e*) shows the density value P(x) of the pixel at the position x of the pixel signal, FIG. 22(*f*) shows the density value P(x−1) of the pixel preceding the pixel at the position x by one pixel along with the density value P(x) of the pixel at the position x, and FIG. 22(*g*) shows the density value P'(x) which is limiter-processed.

It is clear also from this figure that in the case of a two gradation image, a white-colored dot is deformed certainly.

Furthermore, a method of, when a character read by a scanner or the like looks patchy, bolding the character to improve its quality is disclosed by, for example, the following patent references 2.

The following patent reference 2 discloses a method of selecting multiple gradation data having a larger density from among certain multiple gradation data of interest and adjacent multiple gradation data adjacent to this multiple gradation data, and defining the multiple gradation data as noticed picture element data.

While this method provides an advantage of being able to suppress character deformations, but because the method has only the process of selecting data having a maximum density, the pixel value is determined uniquely.

Therefore, there is no other choice but to increase the number of reference pixels in the weight adjustment, like in the case of using the above-mentioned method, and there arises a problem of being unable to perform finer weight adjustment by using the gradation.

Especially, when displaying a two gradation font or two gradation character image data on a multiple gradation display having low resolution after performing bold processing on the font or character image data, because the font or character image data are displayed just in the form of two gradation data in spite of being able to display a high-quality character having improved visibility by using the gradation which the display originally has, there arises a problem of being unable to display a high quality character suitable for a gradation display and a multiple gradation printer.

[Patent reference 1] JP, 3-252696,A (see from the 14th line in the upper left column at page 2 to the 7th line in the upper right column at the same page, and FIGS. 1 and 2)

[Patent reference 2] JP, 6-152932,A

A problem with conventional image processing devices which are constructed as mentioned above is that when outputting a character image to a multiple gradation printer or a multiple gradation display, they cannot perform finer weight adjustment using its gradation, and therefore cannot display a high quality character suitable for the multiple gradation display or the multiple gradation printer.

A further problem is that because, especially when outputting a character image to a display having low resolution or the like, conventional image processing devices cannot carry out finer weight adjustment by using the gradation, a character deformation easily occurs in the character image.

The present invention is made in order to solve the above-mentioned problems, and it is therefore an object of the present invention to provide an image processing device and an image processing program capable of displaying a higher-quality character by carrying out finer weight adjustment of the character by using the gradation of a multiple gradation display or a multiple gradation printer, and being able to prevent a character deformation from occurring.

DISCLOSURE OF THE INVENTION

In accordance with the present invention, there is provided an image processing device including: a first multiplication means for multiplying a pixel signal by a first weighting factor equal to or larger than 0 and equal to or smaller than 1; a delay means for delaying the pixel signal which has not been multiplied yet by the first weighting factor by said first multiplication means by a predetermined number of pixels; and a second multiplication means for multiplying the pixel signal which has been delayed by said delay means by a second weighting factor equal to or larger than 0 and equal to or smaller than 1, a total sum of said first and second weighting factors being larger than 1 and smaller than an upper limit, in which an addition means adds a result of the multiplication by said first multiplication means and a result of the multiplication by said second multiplication means, and a limit means limits a result of the addition by said addition means in such a way that the addition result falls within a maximum density value.

As a result, the present invention provides an advantage of being able to display a higher-quality character because of being able to carry out finer weight adjustment of the character by using the gradation of a multiple gradation display or a multiple gradation printer, and being able to prevent a character deformation from occurring.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
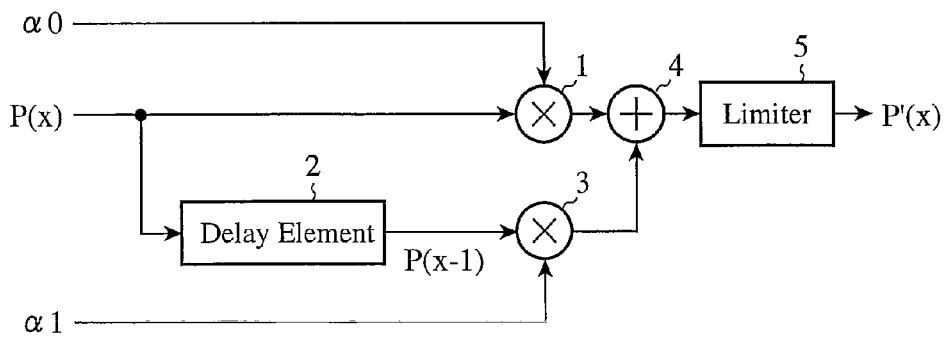
FIG. 1 is a configuration diagram of an image processing device in accordance with Embodiment 1 of the present invention in a case the image processing device performs horizontal bold processing.

FIG. 1 is a configuration diagram of an image processing device in accordance with Embodiment 1 of the present invention in a case in which the image processing device performs bold processing in a horizontal direction. In the figure, a multiplier 1 carries out a process of multiplying a pixel signal P(x) by a weighting factor $\alpha 0$ (a first weighting factor) which is a decimal equal to or larger than 0 and equal to or smaller than 1. The multiplier 1 constructs a first multiplication means.

In this case, while P(x) is a symbol showing the inputted pixel signal, it shows the density values of pixels associated with the pixel signal.

A delay element 2 carries out a process of delaying the pixel signal P(x) which has not been multiplied yet by the weighting factor $\alpha 0$ by the multiplier 1 by a predetermined number of pixels. For example, in order to acquire the density value P(x−1) of pixels preceding the pixels associated with the pixel signal P(x) by one pixel, the delay element 2 delays the pixel signal P(x) by one pixel, and then outputs the pixel signal P(x−1) to the multiplier 3. The delay element 2 constructs a delay means.

A multiplier 3 carries out a process of multiplying the pixel signal P(x−1) which has been delayed by the delay element 2 by a weighting factor $\alpha 1$ (a second weighting factor) which is a decimal equal to or larger than 0 and equal to or smaller than 1, the total sum of the weighting factors $\alpha 0$ and $\alpha 1$ being larger than 1 and smaller than an upper limit $\alpha$max.
The multiplier 3 constructs a second multiplication means.

An adder 4 adds the multiplication result $\alpha 0 \cdot P(x)$ of the multiplier 1 and the multiplication result $\alpha 1 \cdot P(x-1)$ of the multiplier 3, and then outputs the addition result P'(x) to a limiter 5. The adder 4 constructs an addition means.

The limiter 5 carries out a process of limiting the addition result P'(x) of the adder 4 in such a way that the addition result falls within a maximum density value Pmax. The limiter 5 constructs a limit means.

Next, the operation of the image processing device will be explained.

In FIG. 1, the image processing device carries out the bold processing in the horizontal direction, and the pixel signal P(x) is inputted to the multiplier 1 and the delay element 2 of the image processing device.

Furthermore, the weighting factor $\alpha 0$ is inputted to the multiplier 1 of the image processing device, and the weighting factor $\alpha 1$ is inputted to the multiplier 3 of the image processing device.

The weighting factors $\alpha 0$ and $\alpha 1$ are decimals equal to or larger than 0 and equal to or smaller than 1, and are set up in such a way that the total sum of the weighting factors $\alpha 0$ and $\alpha 1$ is larger than 1 and smaller than the upper limit $\alpha$max, as will be shown below.

$$0<=\alpha 0<=1$$

$$0<=\alpha 1<=1$$

$$1<\alpha 0+\alpha 1<\alpha \text{max}$$

When receiving the pixel signal P(x), the multiplier 1 multiplies the pixel signal P(x) by the weighting factor $\alpha 0$, and outputs the multiplication result $\alpha 0 \cdot P(x)$ to the adder 4.

When receiving the pixel signal P(x), the delay element 2 delays the pixel signal P(x) by one pixel in order to acquire the density values P(x−1) of pixels preceding the pixels associated with the pixel signal P(x) by one pixel, and outputs the pixel signal P(x−1) to the multiplier 3.

When receiving the pixel signal P(x−1) from the delay element 2, the multiplier 3 multiplies the pixel signal P(x−1) by the weighting factor $\alpha 1$, and then outputs the multiplication result $\alpha 1 \cdot P(x-1)$ to the adder 4.

When receiving the multiplication result $\alpha 0 \cdot P(x)$ from the multiplier 1 and also receiving the multiplication result $\alpha 1 \cdot P(x-1)$ from the multiplier 3, the adder 4 adds the multiplication result $\alpha 0 \cdot P(x)$ and the multiplication result $\alpha 1 \cdot P(x-1)$, as shown in the following expression (2), and outputs the addition result P'(x) to the limiter 5.

$$P'(x)=\alpha 0 \cdot P(x)+\alpha 1 \cdot P(x-1) \qquad (2)$$

When receiving the addition result P'(x) from the adder 4, the limiter 5 limits the addition result P'(x) in such a way that the addition result falls within the maximum density value Pmax.

More specifically, as shown in the following expression (3), when the addition result P'(x) of the adder 4 exceeds the maximum density value Pmax, the limiter 5 limits the addition result P'(x) of the adder 4 to the maximum density value Pmax, and then outputs the addition result.

When $P'(x)>=P\text{max}$ $$P'(x)=P\text{max} \qquad (3)$$

Figure 2:
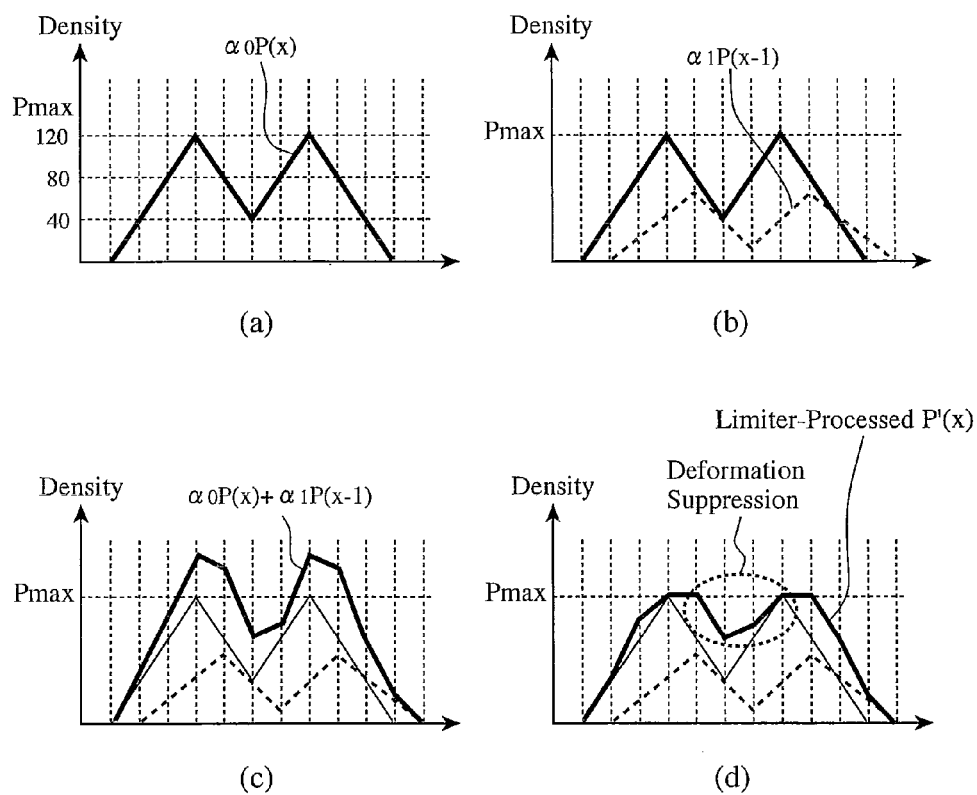
FIG. 2 is an explanatory drawing showing the horizontal bold processing performed by the image processing device.

FIG. 2 is an explanatory drawing showing the bold processing in the horizontal direction which is performed by the image processing device.

In the example of FIG. 2, the weighting factor $\alpha 0$ is set to 1.0 and the weighting factor $\alpha 1$ is set to 0.5.

FIG. 2(a) shows the result $\alpha 0 \cdot P(x)$ of the multiplication of the pixel signal P(x) by the weighting factor $\alpha 0$, and the multiplication result is shown to have the same density values as the pixel signal P(x) because $\alpha 0=1$ is assumed.

FIG. 2(b) shows the result $\alpha 1 \cdot P(x-1)$ of the multiplication of the pixel signal P(x−1) by the weighting factor $\alpha 1$ along with the multiplication result $\alpha 0 \cdot P(x)$ in FIG. 2(a).

FIG. 2(c) shows the result P'(x) of the addition of the multiplication result $\alpha 0 \cdot P(x)$ and the multiplication result $\alpha 1 \cdot P(x-1)$, and FIG. 2(d) shows P'(x) on which the limit process has been performed by the limiter 5.

Hereafter, the bold processing in the horizontal direction will be explained using concrete numeric values.

For example, it is assumed that Pmax=120, and the pixel signal P(x) shown in FIG. 2(a) represents 11 pixels having density values as will be shown below.

P(x)=[0, 40, 80, 120, 80, 40, 80, 120, 80, 40, 0]

In this case, the pixel signal P(x) has four kinds of density values of 0, 40, 80, and 120.

For example, when carrying out the bold processing in the horizontal direction by using a method of selecting a maximum of the values of adjacent picture elements, which is disclosed by above-mentioned patent reference 2, each density value is one of the four kinds of values of 0, 40, 80, and 120 because each density value cannot have any value other than the same value as that of the pixel signal P(x).

Figure 3:
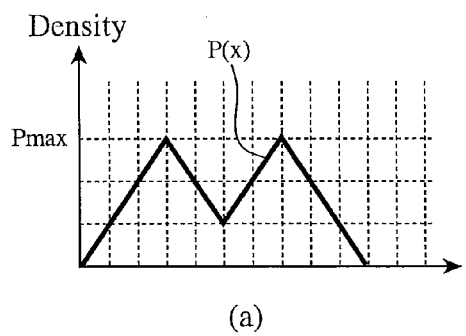
FIG. 3 is an explanatory drawing showing an example of the operation of the image processing device in a case of using a method of selecting a maximum of adjacent picture elements.
Figure 3:
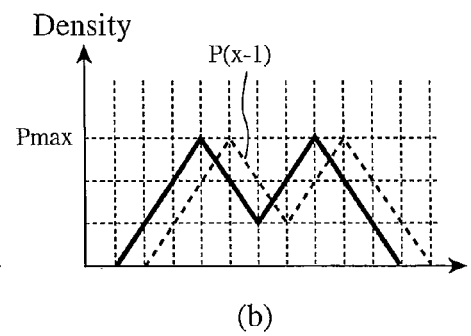
Figure 3:
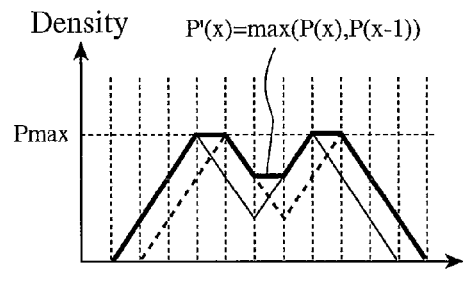
Figure 3:
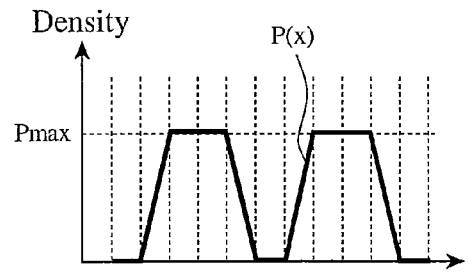
Figure 3:
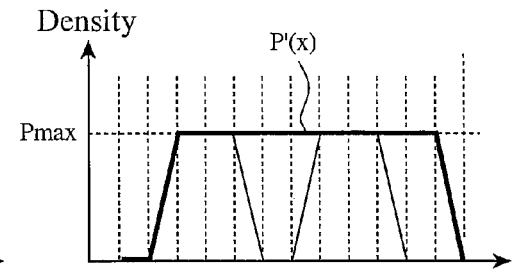
Figure 3:
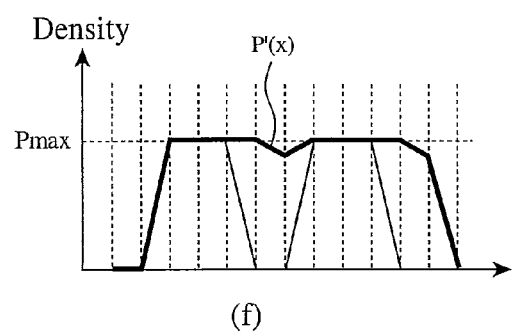

FIG. 3 is an explanatory drawing showing an example of the operation of the image processing device in a case of using the method of selecting a maximum of the values of adjacent picture elements.

FIG. 3(a) shows the pixel signal P(x), and FIG. 3(b) shows the pixel signal P(x) and the pixel signal P(x−1) of the pixels preceding those associated with the pixel signal P(x) by one pixel.

FIG. 3(c) shows the pixel signal P'(x) in which each density value has the selected maximum value.

In contrast, it is clear, as will be shown hereafter, that in the image processing device in accordance with the present Embodiment 1, each density value can be one of six kinds of density values.

[0, 40, 100, 120, 120, 80, 100, 120, 120, 80, 20, 0]

As can also be seen from FIG. 2(d), because a more smooth gradation change can be implemented with increase in the number of density values which each pixel can have, the visibility of characters can be improved.

In accordance with this Embodiment 1, because a larger number of density values (gradation values) are generated by specifying the weighting factors $\alpha 0$ and $\alpha 1$ with arbitrary decimals, the weight in appearance of a character can be controlled by using a density value (a gradation value).

Therefore, the image processing device can carry out high quality bold processing suitable for a gradation display or a multiple gradation printer in which the visibility of characters is improved.

In the case in which the weighting factors $\alpha 0$ and $\alpha 1$ are setup in such a way that they satisfy, for example, the following requirements: $0<=\alpha 0<=1$, $0<=\alpha 1<=1$, and $\alpha 0+\alpha 1=1$, while the image processing device operates as a low pass filter, the image processing device may produce a character image which provides an impression that the character image appears blurred even if the character image has sufficient smoothness.

To solve this problem, in accordance with this Embodiment 1, in order to maintain the low pass filter effect to a certain extent in the sense of keeping the smoothness of the character image, the following requirements: $0<=\alpha 0<=1$ and $0<=\alpha 1<=1$ have to be satisfied, while in order to produce the effect of the bold processing the following requirement: $\alpha 0+\alpha 1>1$ has to be satisfied.

In contrast, although the effect of the bold processing can be further enhanced with increase in $\alpha 0+\alpha 1$, excessive enhancement of the effect of the bold processing causes a deformation to easily occur in the character image.

Therefore, such a deformation can be suppressed by setting up the upper limit $\alpha$max for the sum total of the weighting factors $\alpha 0$ and $\alpha 1$.

Figure 22:
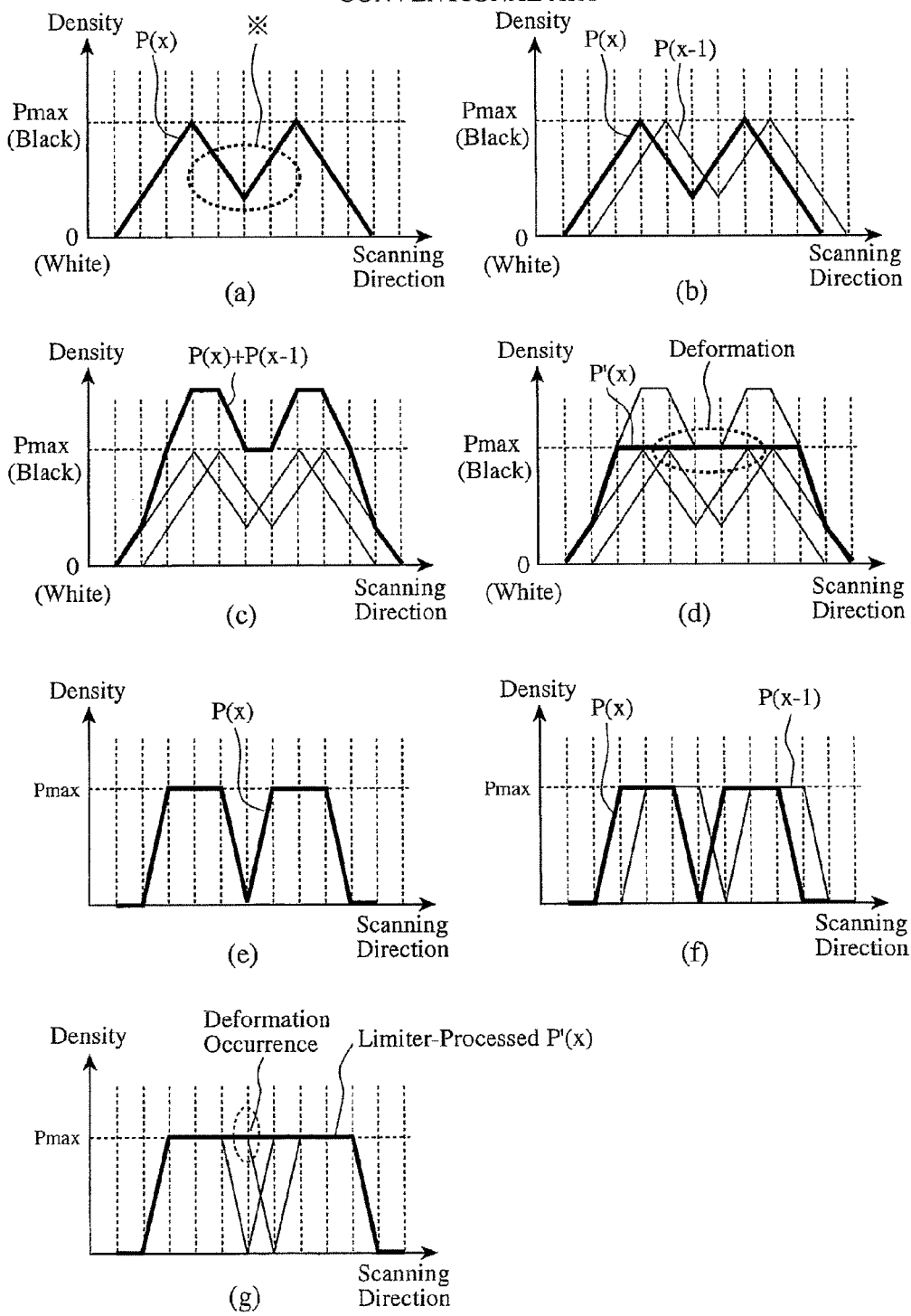
FIG. 22 is an explanatory drawing showing a character deformation in bold processing.

For example, although simple superimposing as shown in FIG. 22 is carried out in such a way that the weighting factors satisfy the following requirements: $\alpha 0=\alpha 1=1$, it is desirable, as can be seen from FIGS. 22(e) to 22(g), that the weighting factors satisfy $\alpha 0+\alpha 1<2$, by especially taking into consideration suppression of a deformation of a two-gradation font which easily becomes deformed.

Therefore, the requirements of $1<\alpha 0+\alpha 1<\alpha$max with the upper limit $\alpha$max for the weighting factors are needed. As a result, while a deformation can be prevented from occurring in a character, high-quality bold processing which can provide control of the weight of the character using density values can be implemented.

In this Embodiment 1, the image processing device which carries out the bold processing with reference to one adjacent pixel is shown, though the present invention is not limited to this structure, and, by referring to a larger number of pixels and then combining an adjustment of the spatial weight of a character and an adjustment of the weight of the character using gradation, the image processing device can adjust the weight of the character with a higher degree of flexibility.

When the number of reference pixels except noticed picture elements is expressed as nmax, the weight control can be shown by the following expression (4).

[Expression 1]

$$P'(x) = \sum_{n=0}^{nmax} \alpha n P(x-n) \quad (4)$$

where $$0 \le \alpha n \le 1$$

$$1 < \sum_{n=0}^{nmax} \alpha n < \alpha\text{max}$$

$$\alpha\text{max} = n\text{max} + 1$$

Hereafter, a case of nmax=2 (a case of referring to two pixels) for the upper limit value $\alpha$max will be explained.

For example, a case, as shown in FIG. 3(d), in which two gradation data which cause a deformation to easily occur are inputted will be considered.

According to the conventional technology, the following relationship: $\alpha 0=\alpha 1=\alpha 2=1$ is established, and a deformation occurs fully. In contrast, in accordance with this Embodiment 1, if the weighting factor $\alpha 2$ is set to satisfy $\alpha 2<1$, a deformation can be prevented from occurring.

Accordingly, by taking into consideration a case of a two-gradation font which causes a deformation to easily occur, a deformation can be prevented from occurring if the upper limit $\alpha$max of the total sum of $\alpha$ is set to three when the number of reference pixels is 2. More generally speaking, when the number of reference pixels is nmax, a deformation can be prevented from occurring if the upper limit $\alpha$max of the total sum of $\alpha$ is set to nmax+1.

In this Embodiment 1, the image processing device which carries out horizontal bold processing is shown, though the present invention is not limited to this example and the image processing device can also carry out bold processing in the vertical direction of preventing a deformation from occurring on the basis of the same concept.

However, because the image processing device needs a pixel signal preceding the current pixel signal by several lines when implementing the bold processing in the vertical direction, the image processing device needs to have line memories for delaying the pixel signal by two or more lines.

Figure 4:
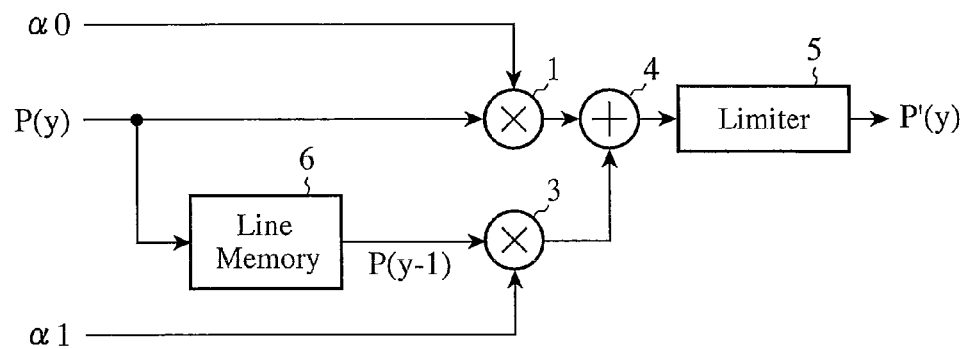
FIG. 4 is a configuration diagram of the image processing device in accordance with Embodiment 1 of the present invention in a case the image processing device performs vertical bold processing.

FIG. 4 is a configuration diagram of the image processing device in accordance with Embodiment 1 of the present invention in the case in which the image processing device performs the bold processing in the vertical direction. In the figure, because the same reference numerals as those shown in FIG. 1 denote the same components or like components, the explanation of these components will be omitted hereafter.

A line memory 6 carries out a process of delaying the pixel signal P (y) by a predetermined number of lines of pixels. For example, in order to acquire the density value P (y−1) of pixels preceding the pixels associated with the pixel signal P (y) by one line of pixels, the line memory 6 delays the pixel signal P(y) by one line of pixels and outputs the pixel signal P(y−1) to the multiplier 3. The line memory 6 constructs a delay means.

Next, the operation of the image processing device will be explained.

The pixel signal P (y) is inputted to the multiplier 1 and the line memory 6 of the image processing device of FIG. 4.

The weighting factor α0 is inputted to the multiplier 1 of the image processing device, and the weighting factor α1 is inputted to the multiplier 3 of the image processing device.

In this case, the weighting factors α0 and α1 are set up in such a way that the total sum of the weighting factors α0 and α1 is larger than 1 and smaller than the upper limit αmax, as will be shown below.

$$0 <= \alpha 0 <= 1$$

$$0 <= \alpha 1 <= 1$$

$$1 < \alpha 0 + \alpha 1 < \alpha max$$

When receiving the pixel signal P(y), the multiplier 1 multiplies the pixel signal P(y) by the weighting factor α0, and outputs the multiplication result α0·P (y) to the adder 4.

When receiving the pixel signal P(y), in order to acquire the density value P(y−1) of pixels preceding the pixels associated with the pixel signal P(y) by one line of pixels, the line memory 6 delays the pixel signal P(y) by one line of pixels and outputs the pixel signal P(y−1) to the multiplier 3.

When receiving the pixel signal P(y−1) from the line memory 6, the multiplier 3 multiplies the pixel signal P(y−1) by the weighting factor α1 and outputs the multiplication result α1·P(y−1) to the adder 4.

When receiving the multiplication result α0·P(y) from the multiplier 1 and also receiving the multiplication result α1·P (y−1) from the multiplier 3, the adder 4 adds the multiplication result α0·P(y) and the multiplication result α1·P (y−1), as shown in the following expression (5), and outputs the result P'(y) of the addition to the limiter 5.

$$P'(y) = \alpha 0 \cdot P(y) + \alpha 1 \cdot P(y-1) \quad (5)$$

When receiving the addition result P'(y) from the adder 4, the limiter 5 limits the addition result P'(y) in such away that the addition result falls within the maximum density value Pmax.

More specifically, as shown in the following expression (6), when the addition result P'(y) of the adder 4 exceeds the maximum density value Pmax, the limiter 5 limits the addition result P'(y) of the adder 4 to the maximum density value Pmax, and then outputs the addition result.

When $P'(y) >= P$max $$P'(y) = P\text{max} \quad (6)$$

Furthermore, the image processing device in accordance with this Embodiment 1 can carry out the bold processing in the horizontal direction and the bold processing in the vertical direction simultaneously.

Figure 5:
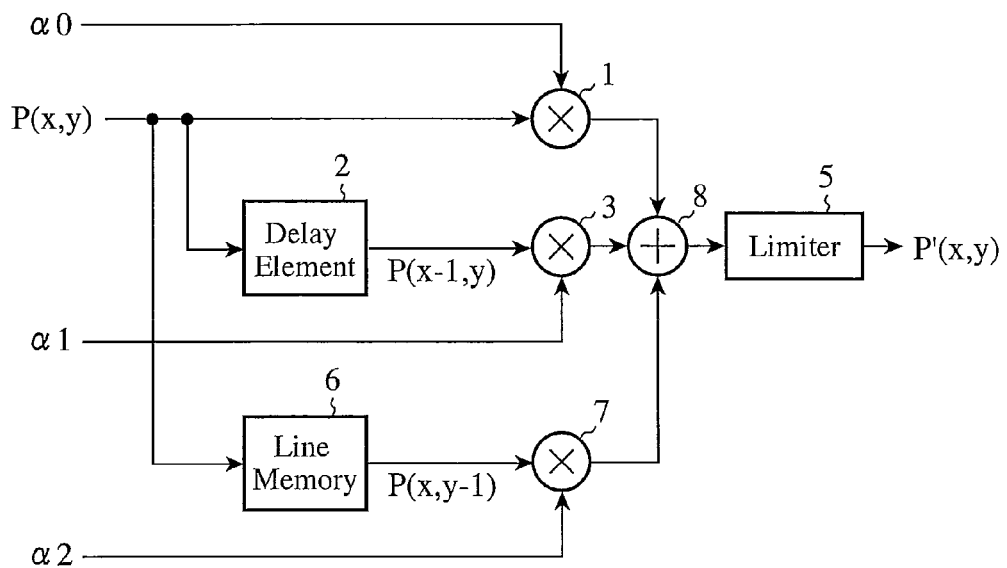
FIG. 5 is a configuration diagram of the image processing device in accordance with Embodiment 1 of the present invention in a case in which the image processing device carries out bold processing in the horizontal direction and bold processing in the vertical direction.

FIG. 5 is a configuration diagram of the image processing device in accordance with Embodiment 1 of the present invention in the case in which the image processing device carries out the bold processing in the horizontal direction and the bold processing in the vertical direction. In the figure, because the same reference numerals as those shown in FIGS. 1 and 4 denote the same components or like components, the explanation of these components will be omitted hereafter.

A multiplier 7 carries out a process of multiplying a pixel signal P(x,y−1) which has been delayed by a line memory 6 by a weighting factor α2.

An adder 8 adds a multiplication result α0·P(x,y) from a multiplier 1, a multiplication result α1·P(x−1,y) from a multiplier 3, and the multiplication result α2·P(x,y−1) from the multiplier 7, and outputs the result P'(x,y) of the addition to a limiter 5.

Next, the operation of the image processing device will be explained.

The pixel signal P(x,y) is inputted to the multiplier 1, a delay element 2, and the line memory 6 of the image processing device of FIG. 5.

The weighting factor α0 is also inputted to the multiplier 1 of the image processing device, the weighting factor α1 is also inputted to the multiplier 3, and the weighting factor α2 is also inputted to the multiplier 7.

The weighting factors α0, α1, and α2 are decimals equal to or larger than 0 and equal to or smaller than 1, and are set up in such a way that the total sum of the weighting factors α0, α1, and α2 is larger than 1 and smaller than the upper limit αmax, as will be shown below.

$$0 <= \alpha 0 <= 1$$

$$0 <= \alpha 1 <= 1$$

$$0 <= \alpha 2 <= 1$$

$$1 < \alpha 0 + \alpha 1 + \alpha 2 < \alpha max$$

When receiving the pixel signal P(x,y), the multiplier 1 multiplies the pixel signal P(x,y) by the weighting factor α0, and outputs the multiplication result α0·P(x,y) to the adder 8.

When receiving the pixel signal P(x,y), the delay element 2 delays the pixel signal P(x,y) by one pixel in order to acquire the density value P(x−1,y) of a pixel preceding the pixel associated with the pixel signal P(x) by one pixel, and outputs the pixel signal P(x−1,y) to the multiplier 3.

When receiving the pixel signal P(x,y), the line memory 6 delays the pixel signal P(x,y) by one line of pixels in order to acquire the density value P(x,y−1) of a pixel preceding the pixel associated with the pixel signal P(x,y) by one line, and then outputs the pixel signal P(x,y−1) to the multiplier 7.

Figure 6:
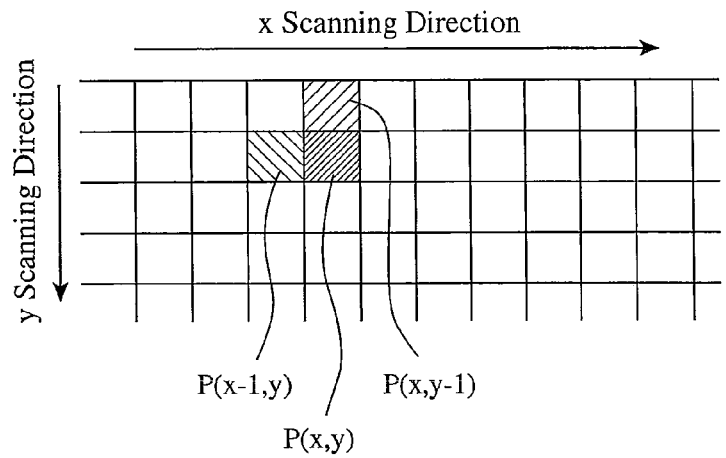
FIG. 6 is an explanatory drawing showing the positions of picture elements of pixel signals P(x,y), P(x−1,y), and P(x, y−1)

FIG. 6 is an explanatory drawing showing the positions of the picture elements respectively associated with the pixel signals P(x,y), P(x−1,y), and P(x,y−1).

When receiving the pixel signal P(x−1,y) from the delay element 2, the multiplier 3 multiplies the pixel signal P(x−1, y) by the weighting factor α1, and outputs the multiplication result α1·P(x−1,y) to the adder 8.

When receiving the pixel signal P(x,y−1) from the line memory 6, the multiplier 7 multiplies the pixel signal P(x,y−1) by the weighting factor α2, and outputs the multiplication result α2·P(x,y−1) to the adder 8.

When receiving the multiplication result α0·P(x,y) from the multiplier 1, receiving the multiplication result α1·P(x−1,y) from the multiplier 3, and receiving the multiplication result α2·P(x,y−1) from the multiplier 7, the adder 8 adds the multiplication result α0·P(x,y), the multiplication result α1·P (x−1,y), and the multiplication result α2·P(x,y−1), as shown in the following expression (7), and then outputs the addition result P'(x,y) to the limiter 5.

$$P'(x,y)=\alpha 0 \cdot P(x,y)+\alpha 1 \cdot P(x-1,y)+\alpha 2 \cdot P(x,y-1) \quad (7)$$

When receiving the addition result P'(x,y) from the adder 8, the limiter 5 limits the addition result P'(x,y) in such a way that the addition result falls within the maximum density value Pmax.

More specifically, as shown in the following expression (8), when the addition result P'(x,y) of the adder 8 exceeds the maximum density value Pmax, the limiter 5 limits the addition result P'(x,y) of the adder 8 to the maximum density value Pmax, and then outputs the addition result.

When $P'(x,y)>=P$max $$P'(x,y)=P\text{max} \quad (8)$$

Figure 7:
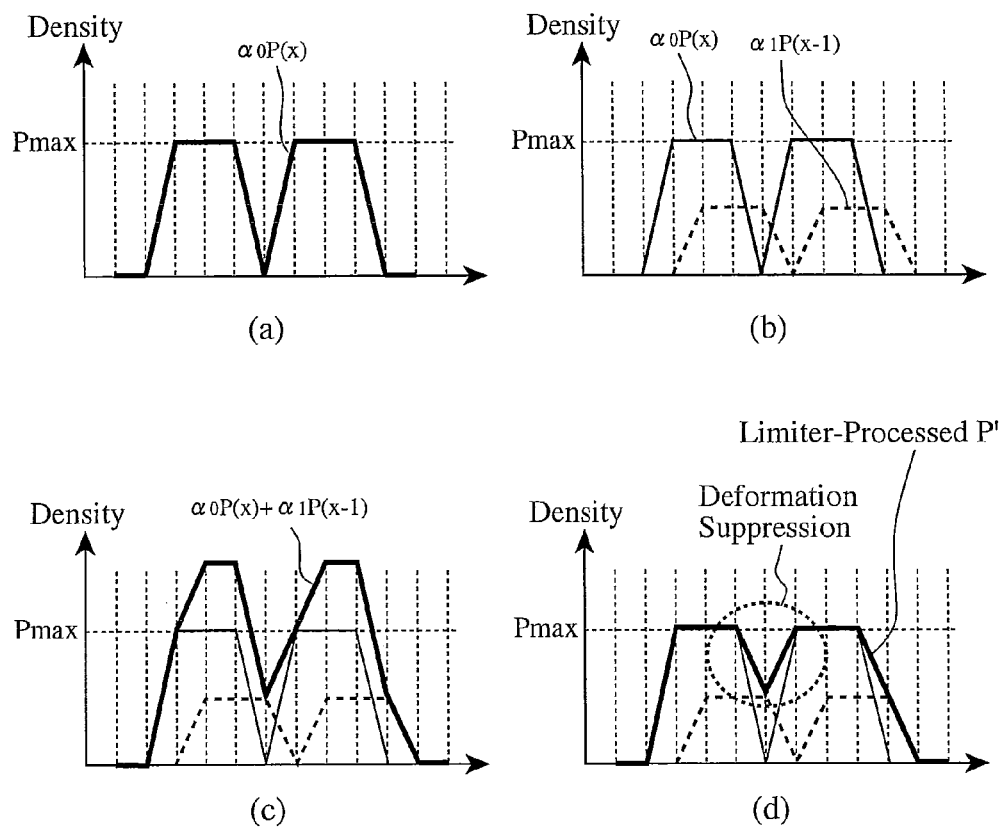
FIG. 7 is an explanatory drawing showing the horizontal bold processing in a case in which the number of steps of gradation of the pixel signals is 2.

FIG. 7 is an explanatory drawing showing the bold processing in the horizontal direction in a case in which the number of steps of gradation of the pixel signal is 2.

FIG. 7(*a*) shows the density value α0·P(x) of the pixel in the case of α0=1, and it can be seen from this figure that P(x) is a binary.

FIG. 7(*b*) shows the density value α1·P(x−1) of the pixel and the density value α0·P(x) of the pixel in the case of α1=0.5, FIG. 7(*c*) shows the sum of the density value α1·P(x−1) of the pixel and the density value α0·P(x) of the pixel, and FIG. 7(*d*) shows the result which is limiter-processed.

It can be seen from these figures that intermediate values which cannot be generated in the case of above-mentioned patent reference 1 and patent reference 2 are generated, ad high-quality bold processing having a smooth gradation change can be implemented.

As can be seen from the above description, the image processing device in accordance with this embodiment 1 includes, for example, the multiplier 1 for multiplying the pixel signal P(x) by the weighting factor α0 equal to or larger than 0 and equal to or smaller than 1, the delay element 2 for delaying the pixel signal P(x) which has not been multiplied by the weighting factor α0 by the multiplier 1 by one pixel, and the multiplier 3 for multiplying the pixel signal P(x−1) which the delay element 2 has acquired by delaying the pixel signal P(x) by the weighting factor α1 equal to or larger than 0 and equal to or smaller than 1, the total sum of the weighting factors α0 and α1 being larger than 1 and smaller than the upper limit αmax. Furthermore, the adder 4 adds the multiplication result α0·P(x) of the multiplier 1 and the multiplication result α1·P(x−1) of the multiplier 3, and the limiter 5 limits the addition result P'(x) of the adder 4 in such a way that the addition result falls within the maximum density value Pmax. Therefore, the image processing device of this Embodiment can generate a larger number of density values (gradation values), and use the density values (the gradation values) to control the weight in appearance of a character. As a result, the image processing device provides an advantage of being able to carry out high-quality bold processing suitable for a gradation display and a multiple gradation printer having a high degree of visibility of characters. Furthermore, because the total sum of the weighting factors α0 and α1 is larger than 1 and is smaller than the upper limit αmax, the image processing device provides another advantage of being able to prevent any deformation from occurring in a character, in addition to an advantage of enhancing the effect of the bold processing.

Embodiment 2

In above-mentioned Embodiment 1, when the image processing device carries out the bold processing in the horizontal direction, the adder 4 adds the multiplication result α0·P(x) of the multiplier 1 and the multiplication result α1·P(x−1) of the multiplier 3, and the limiter 5 limits the addition result P'(x) of the adder 4 in such a way that the addition result falls within the maximum density value Pmax, as previously shown. However, there can be a case as shown in FIG. 2(*d*) in which because the density values of fattened pixels in the pixel signal P'(x) which is outputted from the limiter 5 and on which the bold processing has been preformed are not symmetric in the horizontal direction, and hence a variation occurs in the degree of boldness in the horizontal direction, the image has quality which provides a feeling that something is wrong.

To solve this problem, an image processing device in accordance with this Embodiment 2 is constructed in such a way as to remove this feeling that something is wrong in terms of the image quality.

Figure 8:
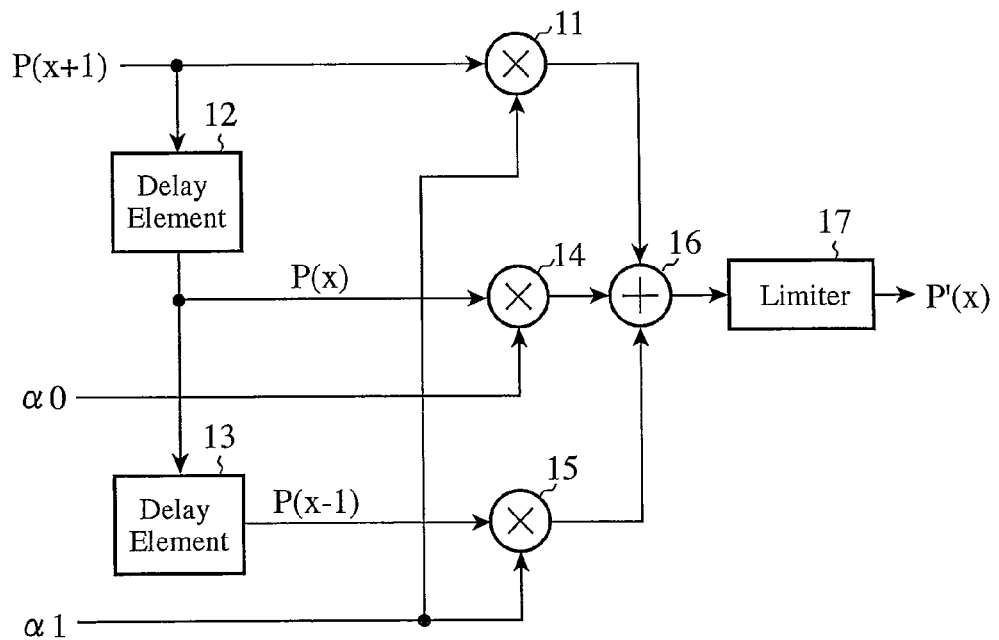
FIG. 8 is a configuration diagram of an image processing device in accordance with Embodiment 2 of the present invention in a case the image processing device performs horizontal bold processing.

FIG. 8 is a configuration diagram of the image processing device in accordance with Embodiment 2 of the present invention in a case in which the image processing device performs bold processing in the horizontal direction. In the figure, a multiplier 11 carries out a process of multiplying a pixel signal P(x+1) by a weighting factor α1 (a first weighting factor) which is a decimal equal to or larger than 0 and equal to or smaller than 1. The multiplier 11 constructs a first multiplication means.

In this case, while P(x+1) is a symbol showing the inputted pixel signal, it shows the density value of the pixel associated with the pixel signal.

In FIG. 1, the weighting factor α0 is handled as the first weighting factor and the weighting factor α1 is handled as the second weighting factor. In contrast, in FIG. 8, the weighting factor α0 is handled as the second weighting factor and the weighting factor α1 is handled as the first weighting factor.

A delay element 12 carries out a process of delaying the pixel signal P(x+1) which has not been multiplied yet by the weighting factor α1 by the multiplier 11 by a predetermined number of pixels. For example, in order to acquire the density value P(x) of a pixel preceding the pixel signal P(x+1) by one pixel, the delay element 12 delays the pixel signal P(x+1) by one pixel, and then outputs the pixel signal P(x) to a delay element 13 and a multiplier 14. The delay element 12 constructs a first delay means.

The delay element 13 carries out a process of delaying the pixel signal P(x) which the delay element 12 has acquired by delaying the pixel signal P(x+1) by a predetermined number of pixels. For example, in order to acquire the density value P(x−1) of a pixel preceding the pixel signal P(x) by one pixel, the delay element 13 delays the pixel signal P(x) by one pixel, and then outputs the pixel signal P(x−1) to a multiplier 15. The delay element 13 constructs a second delay means.

The multiplier 14 carries out a process of multiplying the pixel signal P(x) which the delay element 2 has acquired by delaying the pixel signal P(x+1) by the weighting factor α0 (i.e., the second weighting factor) equal to or larger than 0 and equal to or smaller than 1, the total sum of the weighting factors α0 and α1 being larger than 1 and smaller than an upper limit αmax. The multiplier 14 constructs a second multiplication means.

The multiplier 15 carries out a process of multiplying the pixel signal P(x−1) which the delay element 13 has acquired by delaying the pixel signal P(x) by the weighting factor α1. The multiplier 15 constructs a third multiplication means.

An adder 16 adds the multiplication result α1·P(x+1) of the multiplier 11, the multiplication result α0·P(x) of the multiplier 14, and the multiplication result α1·P(x−1) of the multiplier 15, and outputs the addition result P'(x) to a limiter 17.

The limiter 17 carries out a process of limiting the addition result P'(x) of the adder 16 in such a way that the addition result falls within a maximum density value Pmax. The limiter 17 constructs a limit means.

Next, the operation of the image processing device will be explained.

FIG. 8 shows that the image processing device performs the bold processing in the horizontal direction, and the pixel signal P(x+1) is inputted to the multiplier 11 and the delay element 12 of the image processing device.

The weighting factor $\alpha 1$ is also inputted to the multipliers 11 and 15 of the image processing device, and the weighting factor $\alpha 0$ is also inputted to the multiplier 14 of the image processing device.

The weighting factors $\alpha 0$ and $\alpha 1$ are decimals equal to or larger than 0 and equal to or smaller than 1, and are set up in such a way that the total sum of the weighting factors $\alpha 0$ and $\alpha 1$ is larger than 1 and smaller than the upper limit $\alpha$max, as will be shown below.

The weighting factors $\alpha 0$ and $\alpha 1$ are further set up in such a way that with respect to the density value of the pixel associated with the pixel signal P(x) (i.e., a pixel located at the center in the horizontal direction), the density value of the pixel associated with the pixel signal P(x−1) and that of the pixel associated with the pixel signal P(x+1) are mirror images of each other with respect to the horizontal direction.

$$0<=\alpha 0<=1$$

$$0<=\alpha 1<=1$$

$$1<\alpha 0+2\cdot\alpha 1<\alpha max$$

The upper limit $\alpha$max is equal to (the number of reference pixels which do not include any noticed picture element+1), as described in above-mentioned Embodiment 1. In this case, $\alpha$max=3.

When receiving the pixel signal P(x+1), the multiplier 11 multiplies the pixel signal P(x+1) by the weighting factor $\alpha 1$, and outputs the multiplication result $\alpha 1 \cdot P(x+1)$ to the adder 16.

When receiving the pixel signal P(x+1), the delay element 12 delays the pixel signal P(x+1) by one pixel in order to acquire the density value P(x) of a pixel preceding the pixel associated with the pixel signal P(x+1) by one pixel, and outputs the pixel signal P(x) to the delay element 13 and the multiplier 14.

When receiving the pixel signal P(x) from the delay element 12, the delay element 13 delays the pixel signal P(x) by one pixel in order to acquire the density value P(x−1) of a pixel preceding the pixel associated with the pixel signal P(x) by one pixel, and outputs the pixel signal P(x−1) to the multiplier 15.

When receiving the pixel signal P(x) from the delay element 12, the multiplier 14 multiplies the pixel signal P(x) by the weighting factor $\alpha 0$, and outputs the multiplication result $\alpha 0 \cdot P(x)$ to the adder 16.

When receiving the pixel signal P(x−1) from the delay element 13, the multiplier 15 multiplies the pixel signal P(x−1) by the weighting factor $\alpha 1$, and outputs the multiplication result $\alpha 1 \cdot P(x-1)$ to the adder 16.

When receiving the multiplication result $\alpha 1 \cdot P(x+1)$ from the multiplier 11, receiving the multiplication result $\alpha 0 \cdot P(x)$ from the multiplier 14, and receiving the multiplication result $\alpha 1 \cdot P(x-1)$ from the multiplier 15, the adder 16 adds the multiplication result $\alpha 1 \cdot P(x+1)$, the multiplication result $\alpha 0 \cdot P(x)$, and the multiplication result $\alpha 1 \cdot P(x-1)$, as shown in the following expression (9), and then outputs the addition result P'(x,y) to the limiter 17.

$$P'(x,y)=\alpha 1\cdot P(x+1)+\alpha 0\cdot P(x)+\alpha 1\cdot P(x-1) \quad (9)$$

When receiving the addition result P'(x) from the adder 16, the limiter 17 limits the addition result P'(x) in such a way that the addition result falls within the maximum density value Pmax.

More specifically, as shown in the following expression (10), when the addition result P'(x) of the adder 16 exceeds the maximum density value Pmax, the limiter 17 limits the addition result P'(x) of the adder 16 to the maximum density value Pmax, and then outputs the addition result.

When $P'(x)>=P$max, $$P'(x)=P\text{max} \quad (10)$$

Figure 9:
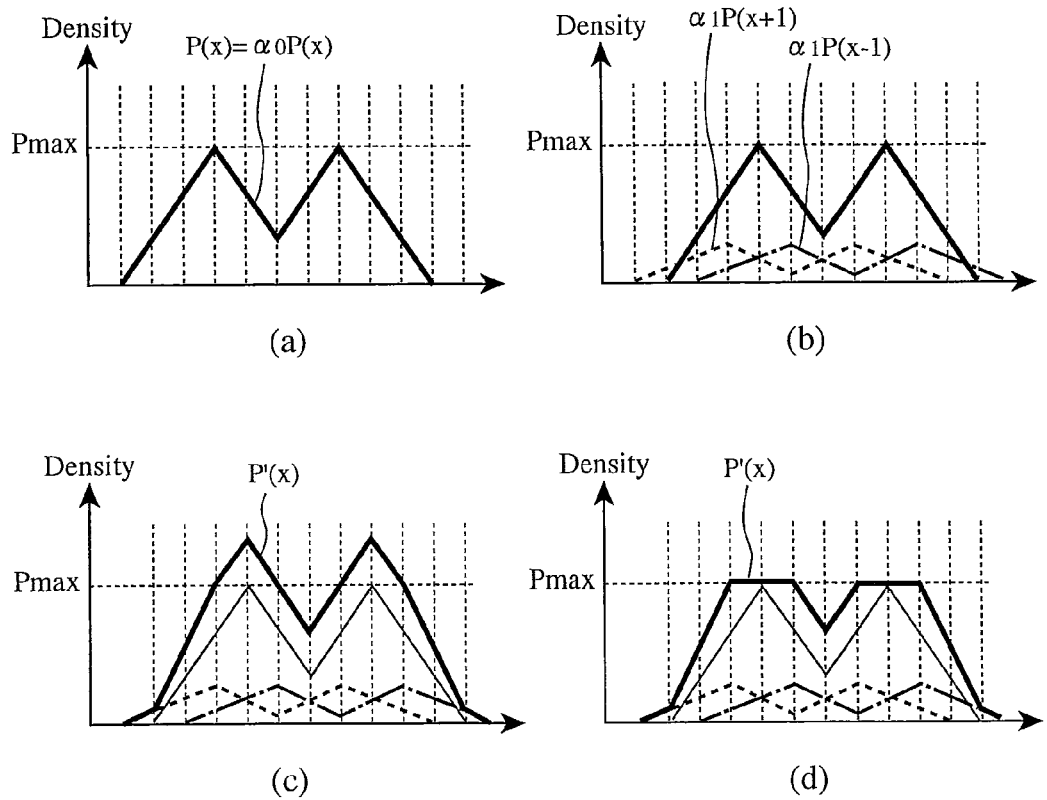
FIG. 9 is an explanatory drawing showing the horizontal bold processing performed by the image processing device.

FIG. 9 is an explanatory drawing showing the bold processing in the horizontal direction which is performed by the image processing device.

In the example of FIG. 9, the weighting factors are set up as follows: $\alpha 0=1.0$ and $\alpha 1=0.25$.

FIG. 9(a) shows the result $\alpha 0 \cdot P(x)$ of the multiplication of the pixel signal P(x) which is the density value of a pixel at the center of three adjacent pixels by the weighting factor $\alpha 0$, and, because $\alpha 0=1$ is assumed, the same density value as that of the pixel signal P(x) is shown in this figure.

FIG. 9(b) shows the result $\alpha 1 \cdot P(x+1)$ of the multiplication of the pixel signal P(x+1) by the weighting factor $\alpha 1$ and the result $\alpha 1 \cdot P(x-1)$ of the multiplication of the pixel signal P(x−1) by the weighting factor $\alpha 1$ along with the multiplication result $\alpha 0 \cdot P(x)$ shown in FIG. 2(a).

FIG. 9(c) shows the result P'(x) of the addition of the multiplication result $\alpha 1 \cdot P(x+1)$, the multiplication result $\alpha 0 \cdot P(x)$, and the multiplication result $\alpha 1 \cdot P(x-1)$, and FIG. 9(d) shows P'(x) which has been limit-processed by the limiter 17.

It can also be seen from FIG. 9 that high quality bold processing can be implemented while the left-right symmetry is maintained.

As previously explained also in above-mentioned Embodiment 1, in the case in which the weighting factors $\alpha 0$ and $\alpha 1$ are set up in such a way that they satisfy, for example, the following requirements: $0<=\alpha 0<=1$, $0<=\alpha 1<=1$, and $\alpha 0+\alpha 1=1$, while the image processing device operates as a low pass filter, the image processing device may produce a character image which provides an impression that the character image appears blurred even if the character image has sufficient smoothness.

To solve this problem, in accordance with this Embodiment 2, in order to maintain the low pass filter effect to a certain extent in the sense of keeping the smoothness of the image, the following requirements: $0<=\alpha 0<=1$ and $0<=\alpha 1<=1$ have to be satisfied, while in order to produce the effect of the bold processing and to prevent any deformation from occurring in a character, the following requirement: $1<\alpha 0+2\cdot\alpha 1<\alpha$max has to be satisfied.

Especially, it is desirable that the upper limit $\alpha$max is set to (the number of reference pixels which do not include any noticed picture element+1) (in this example, $\alpha$max=3). Furthermore, by making the weighting factors have symmetric property, the image processing device makes it possible to cause the gradation change to be symmetric with respect to the noticed picture element, and can implement higher-quality bold processing.

In this Embodiment 2, the image processing device which carries out the bold processing with reference to one pixel on each of the right and left side of the central pixel, i.e., two pixels in total is shown, though the present invention is not limited to this example, and because, by increasing the number of reference pixels, the image processing device can adjust the weight of a character by using a combination of an adjustment of the spatial weight of the character and an adjustment of the weight of the character using gradation, the image processing device can adjust the weight of the character with a higher degree of flexibility.

The weight control can be shown by the following expression (11). In the following expression (11), P(x) denotes the density value of one reference pixel located at the center of the reference pixels.

[Expression 2]

$$P'(x) = \alpha 0 \cdot P(x) + \sum_{n=1}^{nmax} \alpha n \cdot (P(x-n) + P(x+n)) \quad (11)$$

$$0 \le \alpha 0 \le 1 \quad 0 \le \alpha n \le 1$$

$$1 < \alpha 0 + 2\sum_{n=1}^{nmax} \alpha n < \alpha max$$

$$\alpha max = 2 nmax + 1$$

where nmax shows the number of reference pixels running in one of the horizontal directions, and αmax shows (the number of reference pixels which do not include any noticed picture element+1).

In this Embodiment 2, the image processing device which carries out the bold processing in the horizontal direction is shown, though the present invention is not limited to this example and the image processing device can also carry out the bold processing in the vertical direction of preventing a deformation from occurring on the basis of the same concept while maintaining the symmetry.

However, because the image processing device needs the pixel signal of an immediately previous line and that of a second previous line when implementing the bold processing in the vertical direction, the image processing device needs to have line memories for delaying the pixel signal by two or more lines.

Figure 10:
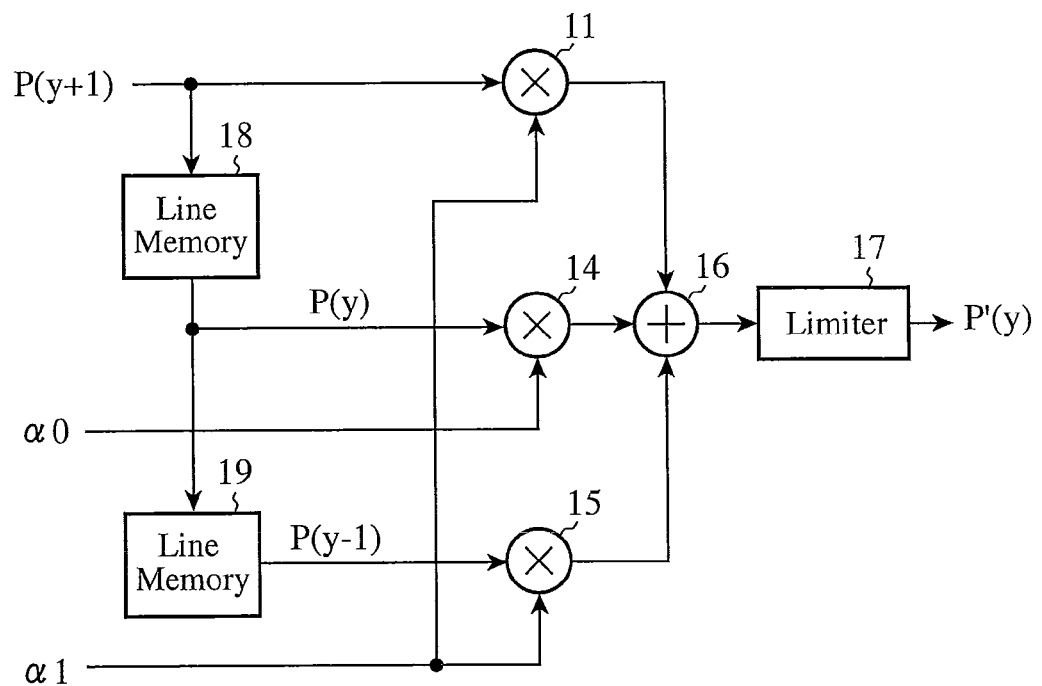
FIG. 10 is a configuration diagram of the image processing device in accordance with Embodiment 2 of the present invention in a case the image processing device performs vertical bold processing.

FIG. 10 is a configuration diagram of the image processing device in accordance with Embodiment 2 of the present invention in the case in which the image processing device performs the bold processing in the vertical direction. In the figure, because the same reference numerals as those shown in FIG. 8 denote the same components or like components, and therefore the explanation of these components will be omitted hereafter:

A line memory 18 carries out a process of delaying the pixel signal P(y+1) by a predetermined number of lines of pixels. For example, in order to acquire the density value P(y) of a pixel preceding the pixel associated with the pixel signal P(y+1) by one line of pixels, the line memory 18 delays the pixel signal P (y+1) by one line of pixels and outputs the pixel signal P(y) to the multiplier 14 and a line memory 19. The line memory 18 constructs a first delay means.

The line memory 19 carries out a process of delaying the pixel signal P(y) outputted from the line memory 18 by a predetermined number of lines of pixels. For example, in order to acquire the density value P(y−1) of a pixel preceding the pixel associated with the pixel signal P (y) by one line of pixels, the line memory 19 delays the pixel signal P(y) by one line of pixels and outputs the pixel signal P(y−1) to the multiplier 15. The line memory 19 constructs a second delay means.

The pixel signal P(y+1) is inputted to the multiplier 11 and the line memory 18 of the image processing device of FIG. 10.

The weighting factor α1 is inputted to the multipliers 11 and 15 of the image processing device, and the weighting factor α0 is inputted to the multiplier 14 of the image processing device.

The weighting factors α0 and α1 are decimals equal to or larger than 0 and equal to or smaller than 1, and are set up in such a way that the total sum of the weighting factors α0 and α1 is larger than 1 and smaller than the upper limit αmax, as will be shown below.

The weighting factors α0 and α1 are further set up in such a way that with respect to the density value of the pixel associated with the pixel signal P(y) (i.e., a pixel located at the center with respect to the vertical direction), the density value of the pixel associated with the pixel signal P(y−1) and that of the pixel associated with the pixel signal P(y+1) are mirror images of each other with respect to the vertical direction.

$$0<=\alpha 0<=1$$

$$0<=\alpha 1<=1$$

$$1<\alpha 0+2\cdot \alpha 1<\alpha max$$

$$\alpha max=3$$

When receiving the pixel signal P(y+1), the multiplier 11 multiplies the pixel signal P(y+1) by the weighting factor α1, and outputs the multiplication result α1·P (y+1) to the adder 16.

When receiving the pixel signal P(y+1), the line memory 18 delays the pixel signal P(y+1) by one line of pixels in order to acquire the density value P(y) of a pixel preceding the pixel associated with the pixel signal P(y+1) by one line, and then outputs the pixel signal P(y) to the line memory 19 and the multiplier 14.

When receiving the pixel signal P(y) from the line memory 18, the line memory 19 delays the pixel signal P(y) by one line of pixels in order to acquire the density value P(y−1) of a pixel preceding the pixel associated with the pixel signal P(y) by one line, and then outputs the pixel signal P(y−1) to the multiplier 15.

When receiving the pixel signal P(y) from the line memory 18, the multiplier 14 multiplies the pixel signal P(y) by the weighting factor α0, and outputs the multiplication result α0·P(y) to the adder 16.

When receiving the pixel signal P(y−1) from the line memory 19, the multiplier 15 multiplies the pixel signal P(y−1) by the weighting factor α1, and outputs the multiplication result α1·P(y−1) to the adder 16.

When receiving the multiplication result α1·P(y+1) from the multiplier 11, receiving the multiplication result α0·P(y) from the multiplier 14, and receiving the multiplication result α1·P(y−1) from the multiplier 15, the adder 16 adds the multiplication result α1·P(y+1), the multiplication result α0·P(y), and the multiplication result α1·P(y−1), as shown in the following expression (12), and then outputs the addition result P'(y) to the limiter 17.

$$P'(y)=\alpha 1 \cdot P(y+1)+\alpha 0 \cdot P(y)+\alpha 1 \cdot P(y-1) \quad (12)$$

When receiving the addition result P'(y) from the adder 16, the limiter 17 limits the addition result P'(y) in such a way that the addition result falls within the maximum density value Pmax.

More specifically, as shown in the following expression (13), when the addition result P'(y) of the adder 16 exceeds the maximum density value Pmax, the limiter 17 limits the addition result P'(y) of the adder 16 to the maximum density value Pmax, and then outputs the addition result.

When $P'(y) >= P\text{max}$, $$P'(y) = P\text{max} \qquad (13)$$

Furthermore, the image processing device in accordance with this Embodiment 2 can carry out the bold processing in the horizontal direction and the bold processing in the vertical direction simultaneously.

Figure 11:
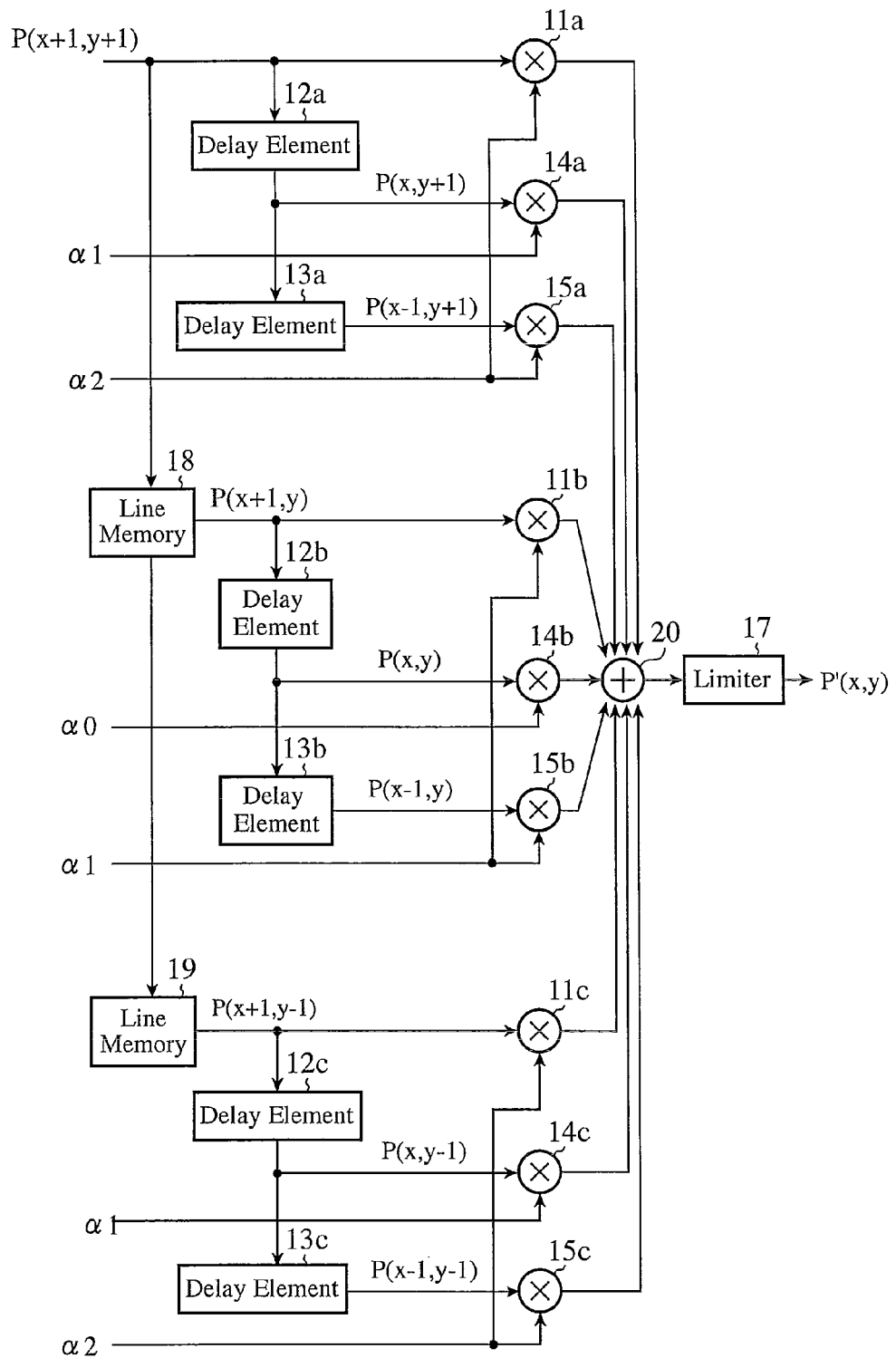
FIG. 11 is a configuration diagram of the image processing device in accordance with Embodiment 2 of the present invention in a case the image processing device performs the horizontal and vertical bold processings.

FIG. 11 is a configuration diagram of the image processing device in accordance with Embodiment 2 of the present invention in the case in which the image processing device carries out the bold processing in the horizontal direction and the bold processing in the vertical direction. In the figure, because the same reference numerals as those shown in FIGS. 8 and 10 denote the same components or like components, the explanation of these components will be omitted hereafter.

Each of multipliers 11a, 11b, and 11c is equivalent to the multiplier 11 of FIG. 8, each of delay elements 12a, 12b, and 12c is equivalent to the delay element 12 of FIG. 8, and each of delay elements 13a, 13b, and 13c is equivalent to the delay element 13 of FIG. 8.

Each of multipliers 14a, 14b, and 14c is equivalent to the multiplier 14 of FIG. 8, and each of multipliers 15a, 15b, and 15c is equivalent to the multiplier 15 of FIG. 8.

An adder 20 adds the multiplication results of the multipliers 11a, 11b, 11c, 14a, 14b, 14c, 15a, 15b, and 15c.

Figure 12:
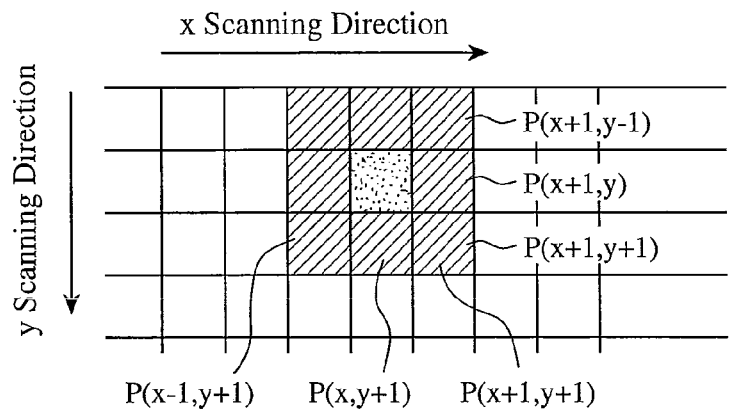
FIG. 12 is an explanatory drawing showing the positions of picture elements of each pixel signal.

FIG. 12 is an explanatory drawing showing the positions of picture elements of each pixel signal.

Next, the operation of the image processing device will be explained.

A pixel signal P(x+1,y+1) is inputted to the multiplier 11a, the delay element 12a, and a line memory 18 of the image processing device of FIG. 11.

A weighting factor $\alpha 2$ is inputted to the multipliers 11a, 15a, 11c, and 15c of the image processing device, a weighting factor $\alpha 1$ is inputted to the multipliers 11b, 15b, 14a, and 14c of the image processing device, and a weighting factor $\alpha 0$ is inputted to the multiplier 14b of the image processing device.

The weighting factors $\alpha 0$, $\alpha 1$, and $\alpha 2$ are decimals equal to or larger than 0 and equal to or smaller than 1, and are set up in such a way that the total sum of the weighting factors $\alpha 0$, $\alpha 1$, and $\alpha 2$ is larger than 1 and smaller than an upper limit $\alpha$max, as will be shown below.

$0 <= \alpha 0 <= 1$ $0 <= \alpha 1 <= 1$ $0 <= \alpha 2 <= 1$ $1 < \alpha 0 + \alpha 1 + \alpha 2 < \alpha\text{max}$ $\alpha\text{max} = 3$ When receiving the pixel signal P(x+1,y+1), the multiplier 11a multiplies the pixel signal P(x+1,y+1) by the weighting factor $\alpha 2$, and outputs the multiplication result $\alpha 2 \cdot P(x+1,y+1)$ to the adder 20.

When receiving the pixel signal P(x+1,y+1), the delay element 12a delays the pixel signal P(x+1,y+1) by one pixel in order to acquire the density value P(x,y+1) of a pixel preceding the pixel associated with the pixel signal P(x+1,y+1) by one pixel, and outputs the pixel signal P(x,y+1) to the delay element 13a and the multiplier 14a.

When receiving the pixel signal P(x,y+1) from the delay element 12a, the delay element 13a delays the pixel signal P(x,y+1) by one pixel in order to acquire the density value P(x-1,y+1) of a pixel preceding the pixel associated with the pixel signal P(x,y+1) by one pixel, and outputs the pixel signal P(x-1,y+1) to the multiplier 15a.

When receiving the pixel signal P(x,y+1) from the delay element 12a, the multiplier 14a multiplies the pixel signal P(x,y+1) by the weighting factor $\alpha 1$, and outputs the multiplication result $\alpha 1 \cdot P(x,y+1)$ to the adder 20.

When receiving the pixel signal P(x-1,y+1) from the delay element 13a, the multiplier 15a multiplies the pixel signal P(x-1,y+1) by the weighting factor $\alpha 2$, and outputs the multiplication result $\alpha 2 \cdot P(x-1,y+1)$ to the adder 20.

When receiving the pixel signal P(x+1,y+1), the line memory 18 delays the pixel signal P(x+1,y+1) by one line of pixels in order to acquire the density value P(x+1,y) of a pixel preceding the pixel associated with the pixel signal P(x+1,y+1) by one line, and then outputs the pixel signal P(x+1,y) to the multiplier 11b, the delay element 12b, and the line memory 19.

When receiving the pixel signal P(x+1,y) from the line memory 18, the line memory 19 delays the pixel signal P(x+1,y) by one line of pixels in order to acquire the density value P(x+1,y-1) of a pixel preceding the pixel associated with the pixel signal P(x+1,y) by one line, and then outputs the pixel signal P(x+1,y-1) to the multiplier 11c and the delay element 12c.

When receiving the pixel signal P(x+1,y) from the line memory 18, the multiplier 11b multiplies the pixel signal P(x+1,y) by the weighting factor $\alpha 1$, and outputs the multiplication result $\alpha 1 \cdot P(x+1,y)$ to the adder 20.

When receiving the pixel signal P(x+1,y) from the line memory 18, the delay element 12b delays the pixel signal P(x+1,y) by one pixel in order to acquire the density value P(x,y) of a pixel preceding the pixel associated with the pixel signal P(x+1,y) by one pixel, and outputs the pixel signal P(x,y) to the delay element 13b and the multiplier 14b.

When receiving the pixel signal P(x,y) from the delay element 12b, the delay element 13b delays the pixel signal P(x,y) by one pixel in order to acquire the density value P(x-1,y) of a pixel preceding the pixel associated with the pixel signal P(x,y) by one pixel, and outputs the pixel signal P(x-1,y) to the multiplier 15b.

When receiving the pixel signal P(x,y) from the delay element 12b, the multiplier 14b multiplies the pixel signal P(x,y) by the weighting factor $\alpha 0$, and outputs the multiplication result $\alpha 0 \cdot P(x,y)$ to the adder 20.

When receiving the pixel signal P(x-1,y) from the delay element 13b, the multiplier 15b multiplies the pixel signal P(x-1,y) by the weighting factor $\alpha 1$, and outputs the multiplication result $\alpha 0 \cdot P(x-1,y)$ to the adder 20.

When receiving the pixel signal P(x+1,y-1) from the line memory 19, the multiplier 11c multiplies the pixel signal P(x+1,y-1) by the weighting factor $\alpha 2$, and outputs the multiplication result $\alpha 2 \cdot P(x+1,y-1)$ to the adder 20.

When receiving the pixel signal P(x+1,y-1) from the line memory 19, the delay element 12c delays the pixel signal P(x+1,y-1) by one pixel in order to acquire the density value P(x,y-1) of a pixel preceding the pixel associated with the pixel signal P(x+1,y-1) by one pixel, and outputs the pixel signal P(x,y-1) to the delay element 13c and the multiplier 14c.

When receiving the pixel signal P(x,y-1) from the delay element 12c, the delay element 13c delays the pixel signal P(x,y-1) by one pixel in order to acquire the density value P(x-1,y-1) of a pixel preceding the pixel associated with the pixel signal P(x,y−1) by one pixel, and outputs the pixel signal P(x−1,y−1) to the multiplier 15*c*.

When receiving the pixel signal P(x,y−1) from the delay element 12*c*, the multiplier 14*c* multiplies the pixel signal P(x,y−1) by the weighting factor α1, and outputs the multiplication result α1·P(x,y−1) to the adder 20.

When receiving the pixel signal P(x−1,y−1) from the delay element 13*c*, the multiplier 15*c* multiplies the pixel signal P(x−1,y−1) by the weighting factor α2, and outputs the multiplication result α2·P(x−1,y−1) to the adder 20.

When receiving the multiplication results from the multipliers 11*a*, 11*b*, 11*c*, 14*a*, 14*b*, 14*c*, 15*a*, 15*b*, and 15*c*, the adder 20 adds these multiplication results, as shown in the following expression (14), and then outputs the addition result P'(x,y) to the limiter 17.

$$P'(x, y) = \alpha 2 \cdot P(x+1, y+1) + \alpha 1 \cdot P(x, y+1) + \alpha 2 \cdot P(x-1, y+1) + \quad (14)$$
$$\alpha 1 \cdot P(x+1, y) + \alpha 0 \cdot P(x, y) + \alpha 1 \cdot P(x-1, y) +$$
$$\alpha 2 \cdot P(x+1, y-1) + \alpha 1 \cdot P(x, y-1) + \alpha 2 \cdot P(x-1, y-1)$$

When receiving the addition result P'(x,y) from the adder 20, the limiter 17 limits the addition result P'(x,y) in such a way that the addition result falls within the maximum density value Pmax.

More specifically, as shown in the following expression (15), when the addition result P'(x,y) of the adder 17 exceeds the maximum density value Pmax, the limiter 17 limits the addition result P'(x,y) of the adder 17 to the maximum density value Pmax, and then outputs the addition result.

When $P'(x,y) >= P\text{max}$, $$P'(x,y) = P\text{max} \quad (15)$$

As can be seen from the above description, the image processing device in accordance with this embodiment 2 includes, for example, the multiplier 11 for multiplying the pixel signal P(x+1) by the weighting factor α1 equal to or larger than 0 and equal to or smaller than 1, the delay element 2 for delaying the pixel signal P(x+1) which has not been multiplied by the weighting factor α1 by the multiplier 11 by one pixel, the delay element 13 for delaying the pixel signal P(x) which the delay element 12 has acquired by delaying the pixel signal P(x+1) by one pixel, the multiplier 14 for multiplying the pixel signal P(x) which the delay element 12 has acquired by delaying the pixel signal P(x+1) by the weighting factor α0 equal to or larger than 0 and equal to or smaller than 1, the total sum of the weighting factors α0 and α1 being larger than 1 and smaller than the upper limit αmax, and the multiplier 15 for multiplying the pixel signal P(x−1) by the weighting factor α1. Furthermore, the adder 16 adds the multiplication result α1·P(x+1) of the multiplier 11, the multiplication result α0·P(x) of the multiplier 14, and the multiplication result α1·P(x−1) of the multiplier 15, and the limiter 17 limits the addition result P'(x) of the adder 16 in such a way that the addition result falls within the maximum density value Pmax. Therefore, the image processing device of this Embodiment can generate a larger number of density values (gradation values), and use the density values (the gradation values) to control the weight in appearance of a character. As a result, the image processing device provides an advantage of being able to carry out high-quality bold processing suitable for a gradation display and a multiple gradation printer having a high degree of visibility of characters. Furthermore, because the total sum of the weighting factors α0 and α1 is larger than 1 and is smaller than the upper limit αmax, the image processing device provides another advantage of being able to prevent any deformation from occurring in a character, in addition to an advantage of enhancing the effect of the bold processing.

In addition, because the weighting factors α0 and α1 are made to have the symmetric property, the image processing device makes it possible to cause the gradation change to be symmetric with respect to the noticed picture element, and can implement higher-quality bold processing.

Embodiment 3

In Embodiments 1 and 2, the image processing device which improves the flexibility of adjustment of the weight of a character by setting up weighting factors which are decimals so as to implement high quality bold processing having a smooth gradation change is shown. However, while a deformation can be prevented from occurring in a character according to the degree of settings of the weighting factors, a deformation cannot be completely prevented from occurring in a character when a pixel signal, such as a pixel signal of a character font having a gradation of three or more steps, is inputted.

In this Embodiment 3 and subsequent Embodiments, an image processing device which completely prevents a deformation from occurring in a character while maintaining the advantages provided by the image processing devices in above-mentioned Embodiments 1 and 2.

Figure 13:
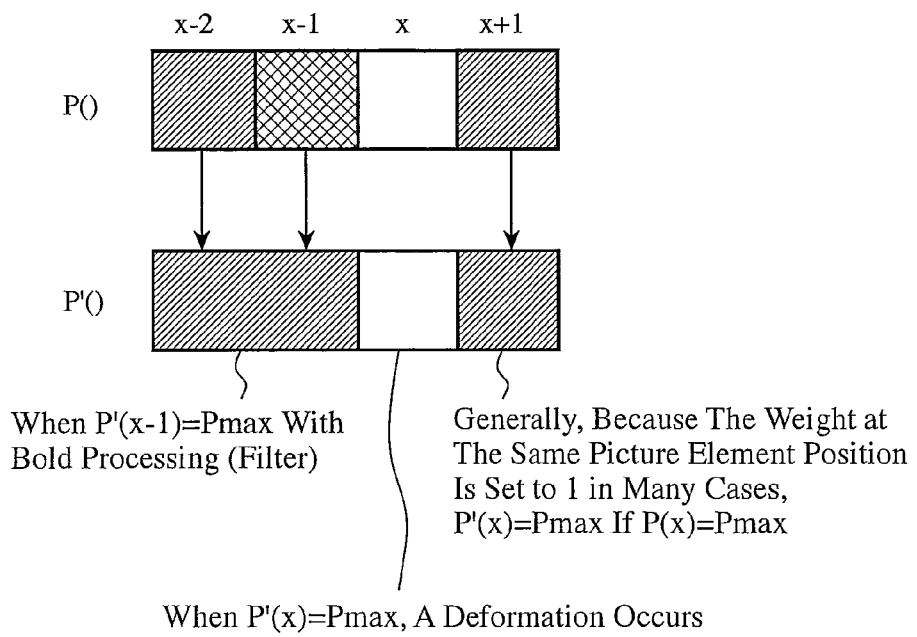
FIG. 13 is an explanatory drawing explaining the bold processing.

Hereafter, for the sake of convenience in explanation, as shown in FIG. 13, a pixel signal at the current picture element position is expressed as P(x), a pixel signal on the just left side of the current picture element position is expressed as P(x−1), and a pixel signal on the just right side of the current picture element position is expressed as P(x+1).

Furthermore, the bold-processed (filtered) pixel signals at the picture element positions are expressed as P'(x−1), P'(x), and P'(x+1).

In this case, criteria by which to judge whether a deformation occurs are that all of the following requirements: P'(x+1)=Pmax, P'(x−1)=Pmax, and P'(x)≠Pmax are satisfied. Actually, because the pixel signal P'(x+1) is the one of a pixel which has not been processed yet, the image processing device cannot know the density value of the pixel signal P'(x+1).

However, because if, for example, P(x+1)=Pmax, the weighting factor of the noticed picture element is usually set to 1 in many cases when performing the bold processing by using this method, P'(x+1) is also equal to Pmax in most cases.

By using this assumption, the image processing device judges that a deformation has occurred when all the following requirements: P(x+1)=Pmax, P'(x−1)=Pmax, P'(x)=Pmax, and P(x)≠Pmax are satisfied.

In these requirements which the image processing device uses to judge whether a deformation has occurred, the value P'(x) which is finally outputted has to be set to a value other than Pmax.

Figure 14:
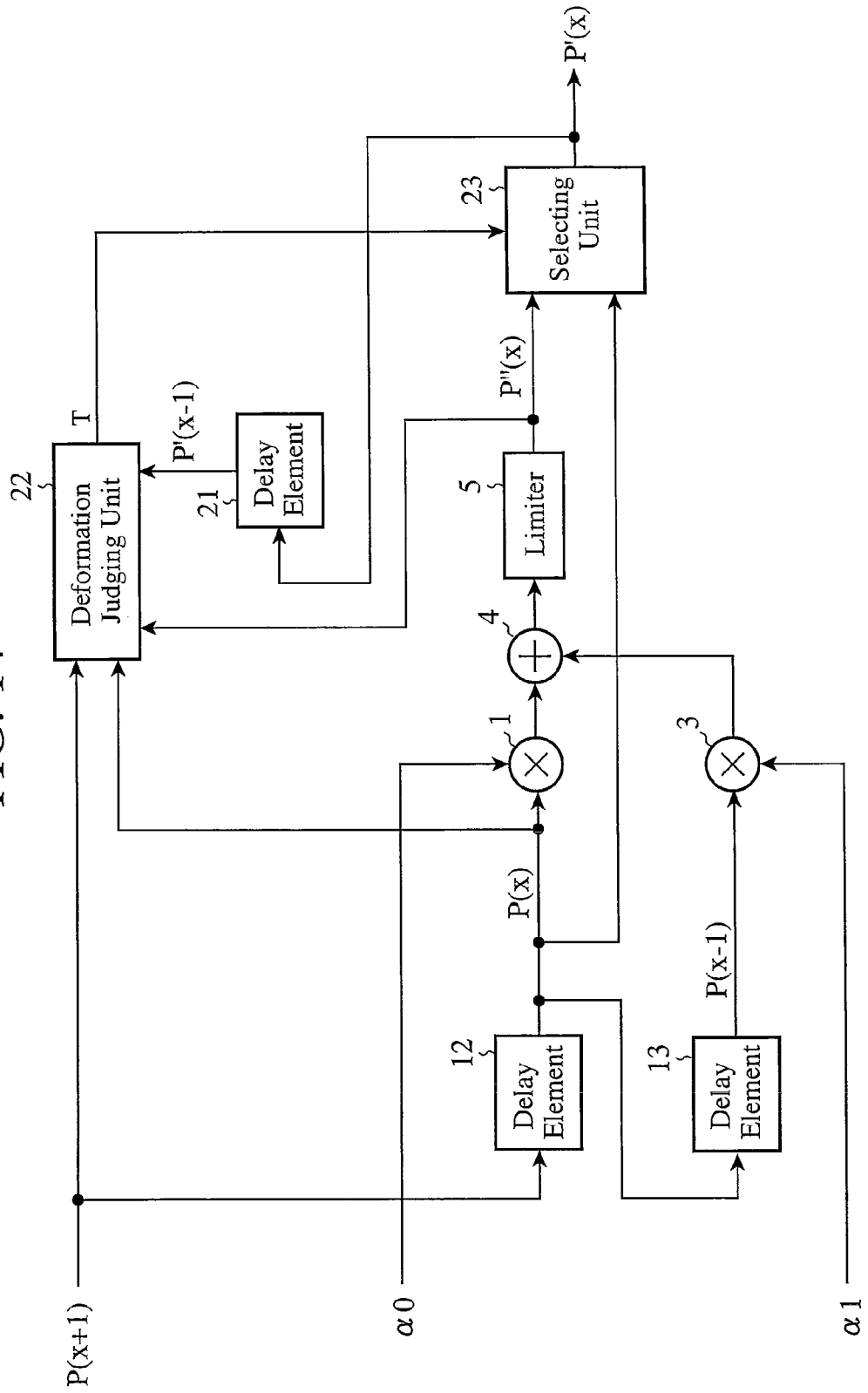
FIG. 14 is a configuration diagram of an image processing device in accordance with Embodiment 3 of the present invention in a case the image processing device performs horizontal bold processing.
Figure 15:
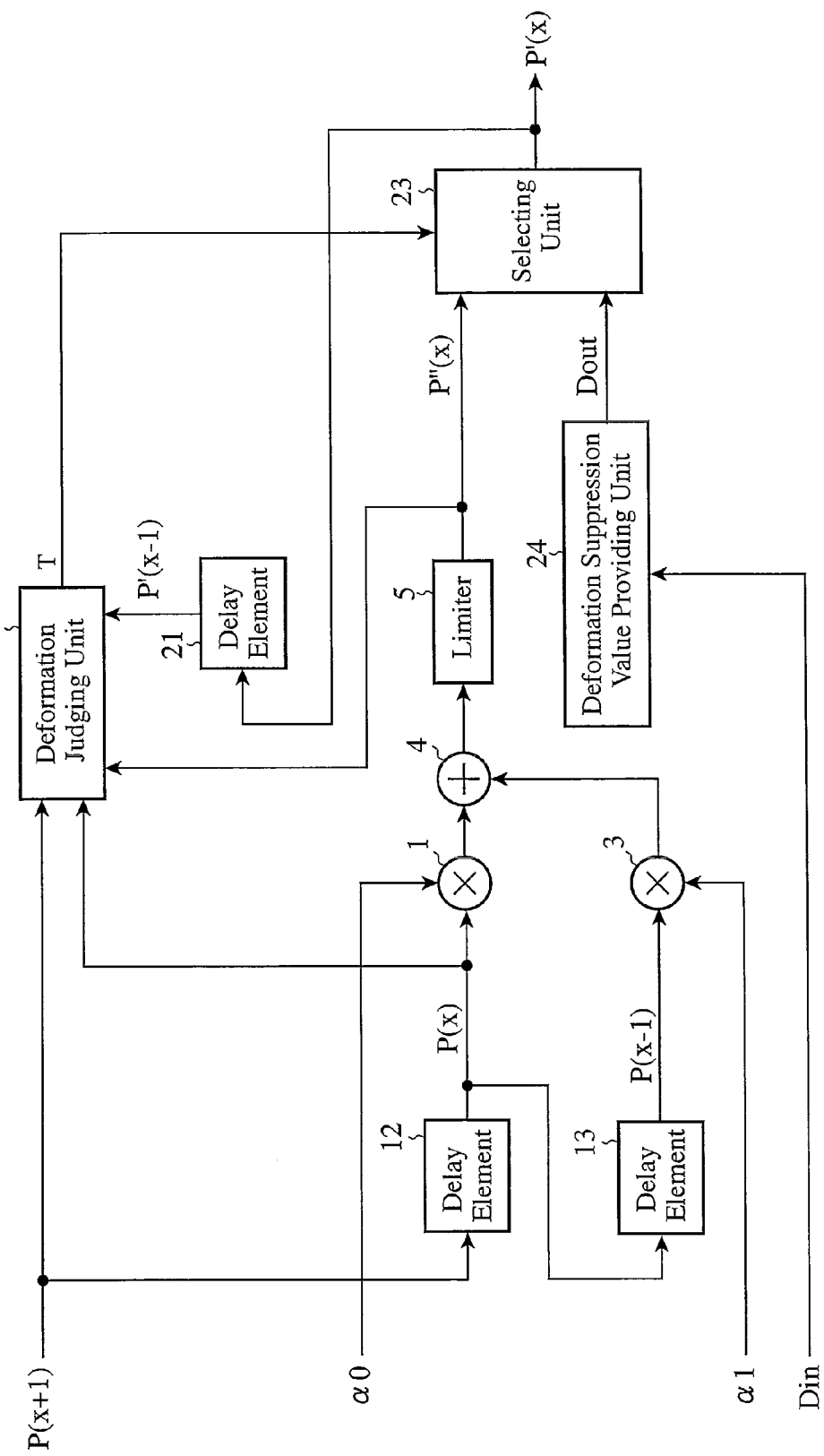
FIG. 15 is a configuration diagram of an image processing device in accordance with Embodiment 4 of the present invention in a case the image processing device performs horizontal bold processing.

FIG. 14 is a configuration diagram of the image processing device in accordance with Embodiment 3 of the present invention in the case in which the image processing device performs the bold processing in the horizontal direction. In the figure, because the same reference numerals as those shown in FIGS. 8 and 10 denote the same components or like components, the explanation of these components will be omitted hereafter.

A delay element 21 delays a pixel signal P"(x) outputted from a limiter 5 by one pixel, and then outputs a pixel signal P'(x−1) to a deformation judging unit 22.

The deformation judging unit 22 carries out a process of judging whether a deformation has occurred in the pixel signal P"(x) outputted from the limiter 5 with reference to the pixel signals P(x+1), P(x), P'(x−1), and P"(x). A deformation judging means is comprised of the delay element 21 and the deformation judging unit 22.

When the deformation judging unit 22 judges that no deformation has occurred in the pixel signal, a selecting unit 23 selects the pixel signal P"(x) outputted from the limiter 5, whereas when the deformation judging unit 22 judges that a deformation has occurred in the pixel signal, the selecting unit 23 selects the pixel signal P(x) which the delay element 12 has acquired by delaying the pixel signal P(x+1), and outputs the selected pixel signal P"(x) or pixel signal P(x) as the pixel signal P'(x).

The selecting unit 23 constructs a selecting means.

Next, the operation of the image processing device will be explained.

Because the image processing device of this Embodiment has the same structure as those in accordance with above-mentioned Embodiments 1 and 2 with the exception that the delay element 21, the deformation judging unit 22, and the selecting unit 23 are added, only the operations of the delay element 21, the deformation judging unit 22, and the selecting unit 23 will be explained hereafter.

When the limiter 5 carries out the same process as that of above-mentioned Embodiment 1 to output the pixel signal P"(x) (in above-mentioned Embodiment 1, it is shown that the limiter 5 outputs the pixel signal P'(x), whereas, in this Embodiment 3, the limiter 5 outputs the pixel signal P"(x) equivalent to the pixel signal P'(x)), the delay element 21 delays the pixel signal P"(x) by one pixel so as to output the pixel signal P'(x−1) to the deformation judging unit 22.

The deformation judging unit 22 judges whether a deformation has occurred in the pixel signal P"(x) outputted from the limiter 5 with reference to the pixel signals P(x+1), P(x), P'(x−1), and P"(x).

In a case in which the concrete operation of the deformation judging unit 22 is written in the C language, the concrete operation of the deformation judging unit can be given by the following expression (16).

[Deformation Criteria]
    if    ((P'(x−1)==Pmax)&&(P(x+1)==Pmax)&&(P(x)!=Pmax) &&(P"(x)==Pmax))

$$T=1$$

else $$T=0 \qquad (16)$$

In the expression (16), T=1 shows that a deformation has occurred, while T=0 shows that no deformation has occurred. The reason why it is judged that a deformation has occurred when this requirement is satisfied is as explained with reference to FIG. 13.

When the deformation judging unit 22 judges that no deformation has occurred, i.e., when T=0, the selecting unit 23 selects the pixel signal P"(x) outputted from the limiter 5, and then outputs the pixel signal P"(x) as the pixel signal P'(x).

In contrast, when the deformation judging unit 22 judges that a deformation has occurred, i.e., when T=1, the selecting unit 23 selects the pixel signal P(x) which the delay element 12 has acquired by delaying the pixel signal P(x+1), and then outputs the pixel signal P(x) as the pixel signal P'(x).

Thus, because the selecting unit outputs the pixel signal P(x) which satisfies P(x)≠Pmax when a deformation has occurred, the image processing device can completely prevent a deformation from occurring.

As can be seen from the above description, the image processing device in accordance with this Embodiment 3 is constructed in such a way that the deformation judging unit 22 refers to the pixel signal P(x) of a noticed picture element, and the pixel signals P(x+1), P'(x−1), and P"(x) of surrounding picture elements, and judges whether a deformation has occurred in the pixel signal P"(x) outputted from the limiter 5, and the selecting unit 23 selects the pixel signal P"(x) outputted from the limiter 5 when the deformation judging unit 22 judges that no deformation has occurred, whereas when the deformation judging unit 22 judges that a deformation has occurred, the selecting unit selects the pixel signal P(x) which the delay element 12 has acquired by delaying the pixel signal P(x+1). Therefore, the present embodiment offers an advantage of being able to completely prevent a deformation from occurring.

In accordance with this Embodiment 3, the deformation judging unit 22 and the selecting unit 23 are applied to the image processing device which performs the bold processing in the horizontal direction, as previously shown. It cannot be overemphasized that, like in above-mentioned Embodiments 1 and 2, by providing line memories, the deformation judging unit 22 and the selecting unit 23 can also be applied to an image processing device which performs the bold processing in the vertical direction, and an image processing device which performs the bold processing in the horizontal direction and the bold processing in the vertical direction.

Embodiment 4

FIG. 14 is a configuration diagram of an image processing device in accordance with Embodiment 4 of the present invention in a case in which the image processing device performs bold processing in a horizontal direction. In the figure, because the same reference numerals as those shown in FIG. 14 denote the same components or like components, the explanation of these components will be omitted hereafter.

A deformation suppression value providing unit 24 outputs a pixel signal Dout for deformation suppression to a selecting unit 23. For example, the deformation suppression value providing unit 24 receives a setting of a pixel signal whose signal value is smaller than a maximum density value Pmax, and outputs, as the pixel signal Dout for deformation suppression, the pixel signal to the selecting unit 23. The deformation suppression value providing unit 24 constructs a deformation suppression pixel signal providing means.

Next, the operation of the image processing device will be explained.

When a user presets, as the pixel signal for deformation suppression, a pixel signal whose signal value is smaller than the maximum density value Pmax to the deformation suppression value providing unit 24, the deformation suppression value providing unit 24 outputs the pixel signal Dout for deformation suppression which has been set to the selecting unit 23 by the user.

When the deformation judging unit 22 judges that no deformation has occurred, i.e., when T=0, the selecting unit 23 selects the pixel signal P"(x) outputted from the limiter 5, and then outputs the pixel signal P"(x) as the pixel signal P'(x), like in the case of above-mentioned Embodiment 3.

In contrast, when the deformation judging unit 22 judges that a deformation has occurred, i.e., when T=1, the selecting unit 23 selects the pixel signal Dout for deformation suppression, which is outputted from the deformation suppression value providing unit 24, and outputs, as the pixel signal P'(x), the pixel signal Dout.

Thus, because the selecting unit outputs the pixel signal Dout for deformation suppression which satisfies P(x)≠Pmax when a deformation has occurred, the image processing device can completely prevent a deformation from occurring, like in the case of above-mentioned Embodiment 3.

In this Embodiment 4, the deformation suppression value providing unit 24 is applied to the image processing device which performs the bold processing in the horizontal direction, as previously shown. It cannot be overemphasized that, like in above-mentioned Embodiments 1 and 2, by providing line memories, the deformation suppression value providing unit 24 can also be applied to an image processing device which performs the bold processing in the vertical direction, and an image processing device which performs the bold processing in the horizontal direction and the bold processing in the vertical direction.

Embodiment 5

Figure 16:
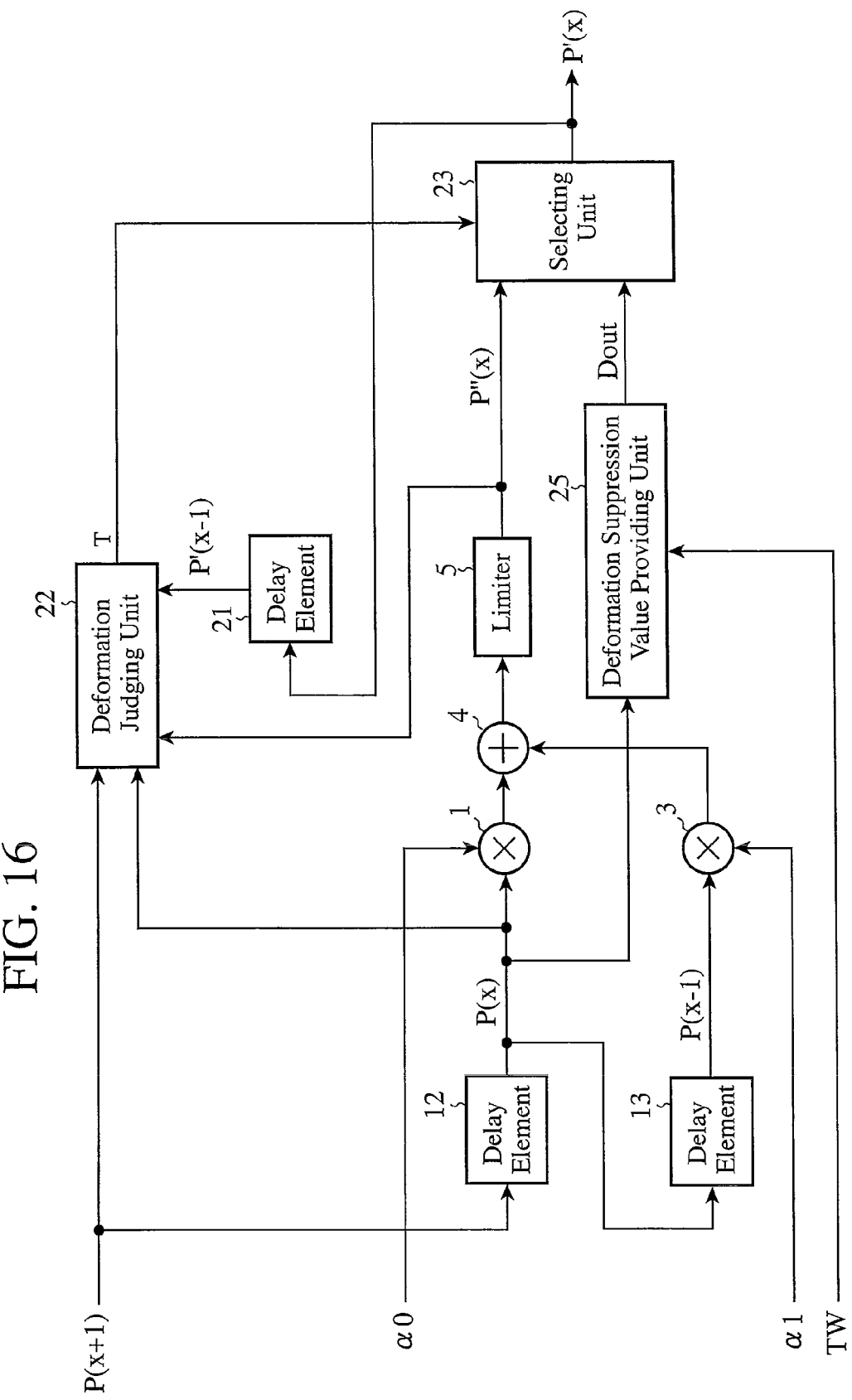
FIG. 16 is a configuration diagram of an image processing device in accordance with Embodiment 5 of the present invention in a case the image processing device performs horizontal bold processing.

FIG. 16 is a configuration diagram of an image processing device in accordance with Embodiment 5 of the present invention in the case in which the image processing device performs bold processing in the horizontal direction. In the figure, because the same reference numerals as those shown in FIG. 14 denote the same components or like components, the explanation of these components will be omitted hereafter.

A deformation suppression value providing unit 25 calculates a weighting average of the signal value of a pixel signal P(x) which a delay element 12 has acquired by delaying another pixel signal, and a maximum density value Pmax, and outputs the weighting average Dout to a selecting unit 23. The deformation suppression value providing unit 25 constructs a deformation suppression pixel signal providing means.

Next, the operation of the image processing device will be explained.

When receiving the pixel signal P(x) from the delay element 12, the deformation suppression value providing unit 25 calculates a weighting average of the signal value of the pixel signal P(x), and the maximum density value Pmax by using a weighting factor TW, as shown in the following expression (17), and then outputs the weighting average Dout to the selecting unit 23.

$$Dout=TW \times P(x)+(1-TW) \times Pmax$$

$$0<TW<1 \qquad (17)$$

When the deformation judging unit 22 judges that no deformation has occurred, i.e., when T=0, the selecting unit 23 selects the pixel signal P''(x) outputted from the limiter 5, and then outputs the pixel signal P''(x) as the pixel signal P'(x), like in the case of above-mentioned Embodiment 3.

In contrast, when the deformation judging unit 22 judges that a deformation has occurred, i.e., when T=1, the selecting unit 23 selects the weighting average Dout outputted from the deformation suppression value providing unit 25, which is the pixel signal for deformation suppression, and outputs, as the pixel signal P'(x), the weighting average Dout.

In the case of above-mentioned Embodiment 3, the pixel signal Dout for deformation suppression on which no bold processing is performed is outputted for a pixel in which a deformation can occur.

In contrast, the image processing device in accordance with this Embodiment 5 performs the bold processing on a pixel in which a deformation can occur to such an extent that no deformation occurs in the pixel. Therefore, the image processing device can provide a higher-quality bold-processed image.

Because the user can be made to set up the weighting factor TW, the image processing device provides another advantage of being able to enable the user to control the degree of boldness with which to bold a character freely.

In this Embodiment 5, the deformation suppression value providing unit 25 is applied to the image processing device which performs the bold processing in the horizontal direction, as previously shown. It cannot be overemphasized that, like in above-mentioned Embodiments 1 and 2, by providing line memories, the deformation suppression value providing unit 25 can also be applied to an image processing device which performs the bold processing in the vertical direction, and an image processing device which performs the bold processing in the horizontal direction and the bold processing in the vertical direction.

Embodiment 6

Figure 17:
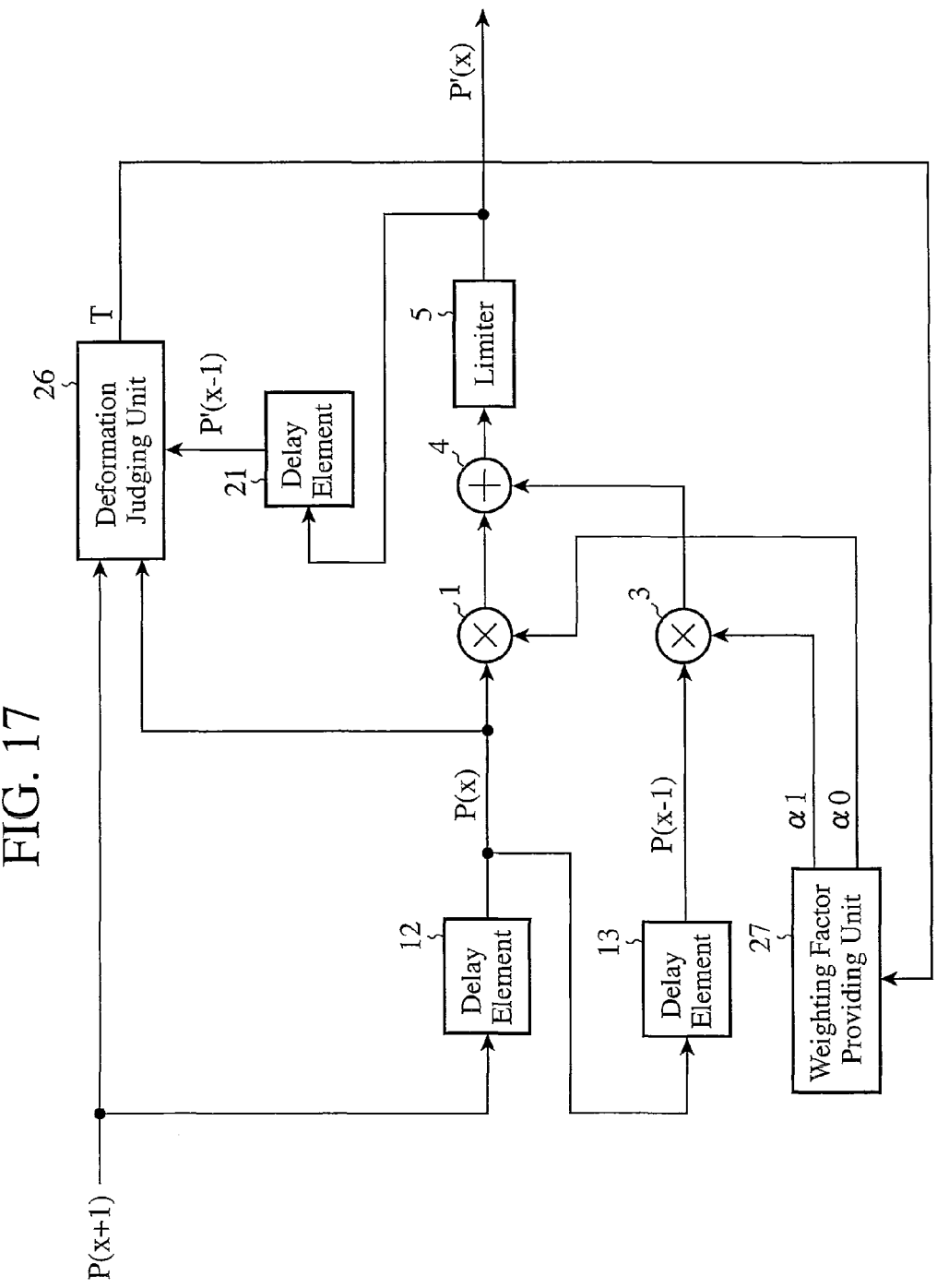
FIG. 17 is a configuration diagram of an image processing device in accordance with Embodiment 6 of the present invention in a case the image processing device performs horizontal bold processing.

FIG. 17 is a configuration diagram of an image processing device in accordance with Embodiment 6 of the present invention in a case in which the image processing device performs bold processing in a horizontal direction. In the figure, because the same reference numerals as those shown in FIG. 14 denote the same components or like components, the explanation of these components will be omitted hereafter.

A deformation judging unit 26 carries out a process of judging whether a deformation can occur in a pixel signal P''(x) outputted from a limiter 5 with reference to pixel signals P(x+1), P(x), and P'(x−1). A deformation judging means is comprised of a delay element 21 and the deformation judging unit 26.

A weighting factor providing unit 27 carries out a process of updating weighting factors $\alpha 0$ and $\alpha 1$ according to the result of the judgment performed by the deformation judging unit 26. More specifically, when the deformation judging unit 26 judges that there is no possibility of occurrence of a deformation, the weighting factor providing unit 27 sets each of the weighting factors $\alpha 0$ and $\alpha 1$ to be equal to or larger than 0 and equal to or smaller than 1 in such a way that the total sum of the weighting factors $\alpha 0$ and $\alpha 1$ is larger than 1 and smaller than an upper limit, whereas when the deformation judging unit 26 judges that there is a possibility of occurrence of a deformation, the weighting factor providing unit sets each of the weighting factors $\alpha 0$ and $\alpha 1$ to be equal to or larger than 0 and equal to or smaller than 1 in such a way that the total sum of the weighting factors $\alpha 0$ and $\alpha 1$ is smaller than 1. The weighting factor providing unit 27 constructs a weighting factor updating means.

Next, the operation of the image processing device will be explained.

The deformation judging unit 22 in accordance with any of above-mentioned Embodiments 3 to 5 includes whether or not the pixel signal P''(x) outputted from the limiter 5 has a value of Pmax to the criteria by which to judge whether a deformation has occurred. The deformation judging unit 26 in this Embodiment 6 differs from the deformation judging unit 22 in accordance with any of above-mentioned Embodiments 3 to 5 in that the deformation judging unit 26 does not include whether or not the pixel signal P''(x) outputted from the limiter 5 has a value of Pmax to the criteria by which to judge whether a deformation has occurred.

Because the deformation judging unit 26 does not include whether or not the pixel signal P″(x) outputted from the limiter 5 has a value of Pmax to the criteria by which to judge whether a deformation has occurred, the deformation judging unit 26 cannot detect occurrence of a deformation certainly, but can detect "the possibility of occurrence of a deformation."

More specifically, the deformation judging unit 26 judges whether or not there is a possibility of occurrence of a deformation in the pixel signal P″(x) outputted from the limiter 5 with reference to the pixel signals P(x+1), P(x), and P′(x−1).

The concrete operation of the deformation judging unit 27 can be expressed by the following expression (18) when written in the C language.
[Deformation Criteria]
if((P′(x−1)==Pmax)&&(P(x+1)==Pmax)&&(P(x)!=Pmax))

$T=1$ else $T=0$ (18)

The weighting factor providing unit 27 updates the weighting factors $\alpha 0$ and $\alpha 1$ according to the result of the judgment performed by the deformation judging unit 26.

More specifically, when the deformation judging unit 26 judges that there is no possibility of occurrence of a deformation, that is, in the case of T=0, the weighting factor providing unit 27 sets each of the weighting factors $\alpha 0$ and $\alpha 1$ to be equal to or larger than 0 and equal to or smaller than 1 in such a way that the total sum of the weighting factors $\alpha 0$ and $\alpha 1$ is larger than 1 and smaller than an upper limit, as will be mentioned below.

In contrast, when the deformation judging unit 26 judges that there is a possibility of occurrence of a deformation, that is, in the case of T=1, the weighting factor providing unit sets each of the weighting factors $\alpha 0$ and $\alpha 1$ to be equal to or larger than 0 and equal to or smaller than 1 in such a way that the total sum of the weighting factors $\alpha 0$ and $\alpha 1$ is smaller than 1, as will be mentioned below.
[For bold processing→when T=0] $\alpha 0=1.0$ and $\alpha 1=0.5$
[For prevention of deformation→when T=1] $\alpha 0=0.5$ and $\alpha 1=0.5$ When the deformation judging unit 26 judges that there is a possibility of occurrence of a deformation, that is, in the case of T=1, a setup of the weighting factors which satisfies $1<\alpha 0+\alpha 1<2$ can produce the effect of the bold processing, but may raise a possibility of occurrence of a deformation.

In contrast, because the weighting factor providing unit 27 sets up the weighting factor $\alpha 0$ and $\alpha 1$ in such a way that the weighting factors satisfy $\alpha 0+\alpha 1<=1$ when the deformation judging unit judges that there is a possibility of occurrence of a deformation, as mentioned above, the image processing device can eliminate the effect of the bold processing and can prevent a deformation from occurring.

The weighting factors $\alpha 0$ and $\alpha 1$ for deformation prevention are not limited to the above-mentioned examples, and two or more different sets of weighting factors can be alternatively provided and one set of weighting factors can be selected from the two or more different sets of weighting factors.

As can be seen from the above description, the image processing device in accordance with this Embodiment 6 is constructed in such a way that when the deformation judging unit 26 judges that there is no possibility of occurrence of a deformation, the weighting factor providing unit sets each of the weighting factors $\alpha 0$ and $\alpha 1$ to be equal to or larger than 0 and equal to or smaller than 1 in such a way that the total sum of the weighting factors $\alpha 0$ and $\alpha 1$ is larger than 1 and smaller than an upper limit, whereas when the deformation judging unit 26 judges that there is a possibility of occurrence of a deformation, the weighting factor providing unit sets each of the weighting factors $\alpha 0$ and $\alpha 1$ to be equal to or larger than 0 and equal to or smaller than 1 in such a way that the total sum of the weighting factors 0:0 and $\alpha 1$ is smaller than 1. Therefore, the present embodiment offers an advantage of being able to output a high-quality bold-processed image, while preventing a deformation from occurring in the image.

In this Embodiment 6, the weighting factor providing unit 27 is applied to the image processing device which performs the bold processing in the horizontal direction, as previously shown. It cannot be overemphasized that, like in above-mentioned Embodiments 1 and 2, by providing line memories, the weighting factor providing unit 27 can also be applied to an image processing device which performs the bold processing in the vertical direction, and an image processing device which performs the bold processing in the horizontal direction and the bold processing in the vertical direction.

Embodiment 7

In this Embodiment 7, a case in which the image processing device in accordance with any of above-mentioned Embodiments 1 to 6 is applied to a receiver of digital data broadcasting will be explained.

In digital data broadcasting, there can be a case in which character data are distributed as a character code and a case in which character data are distributed as a bitmapped image like a custom character.

Figure 18:
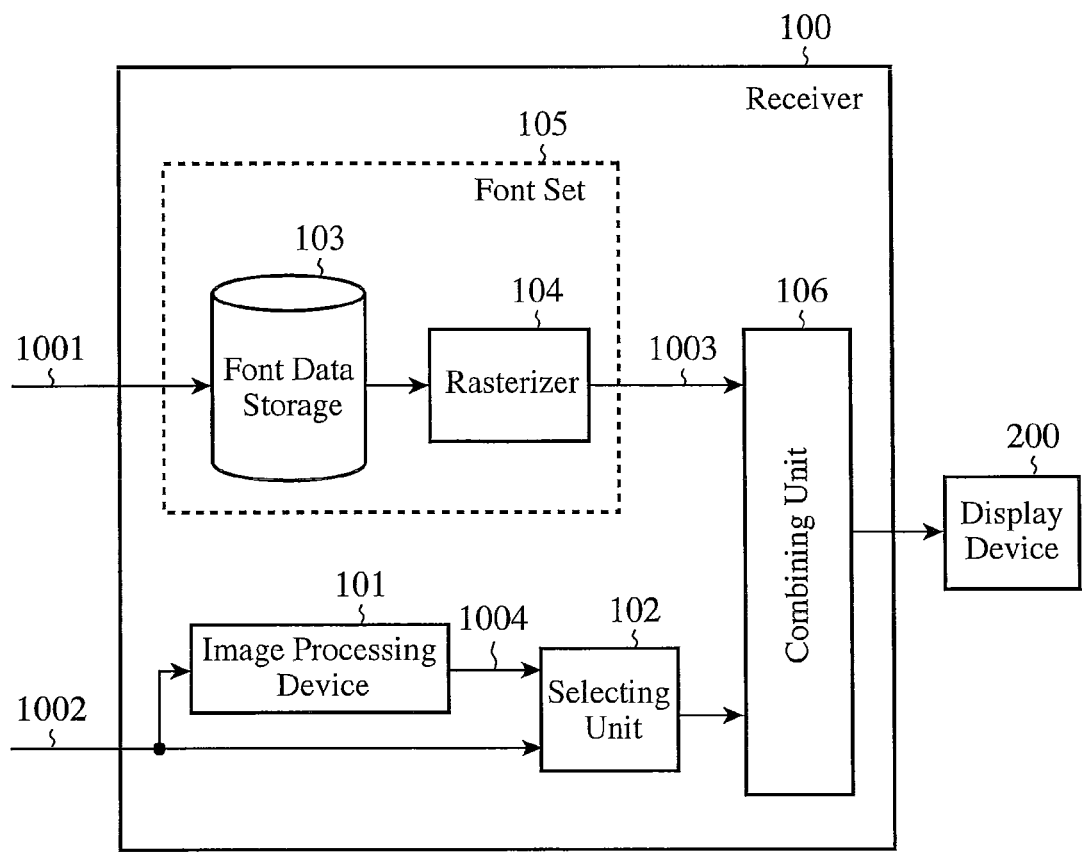
FIG. 18 is a configuration diagram showing a receiver in accordance with Embodiment 7 of the present invention.

FIG. 18 is a configuration diagram showing the receiver in accordance with Embodiment 7 of the present invention.

In the figure, the receiver 100 is provided with an image processing device 101, a selecting unit 102, a font set 105 (a font data storage 103 and a rasterizer 104 having a bold processing function), and a combining unit 106.

The receiver 100 displays generated character data on a display device 200. When a character code 1001 is inputted, the font data storage 103 and the rasterizer 104 of the font set 105 generate a bitmapped image of either an ordinary character or a bolded character of the character code.

In contrast, when a custom character 1002 is inputted, because the custom character 1002 is a bitmapped image and therefore the receiver cannot use the bold processing function of the rasterizer 104, the image processing device 101 in accordance with any of above-mentioned Embodiments 1 to 6 performs the bold processing on the bitmapped image to generate a bitmapped image of a bolded form 1004 of the custom character.

The selecting unit 102 selects either the bitmapped image of the custom character 1002 or the bitmapped image of the bolded character 1004.

The combining unit 106 combines the bitmapped image of the custom character 1002 or the bitmapped image of the bolded character 1004, which is selected by the selecting unit 102, and the bitmapped image of the bolded character 1003 which is outputted by the rasterizer 104, and outputs the combined images to the display device 200.

This receiver 100 has to have both the bold processing function of the rasterizer 104, and a bold processing function of bolding a bitmapped image. Providing the single receiver 100 with the plurality of board processing functions is costly duplication, while the existing of several character images which are bold-processed according to a plurality of different algorithms on the same screen raises a possibility of providing uncomfortable image quality.

Figure 19:
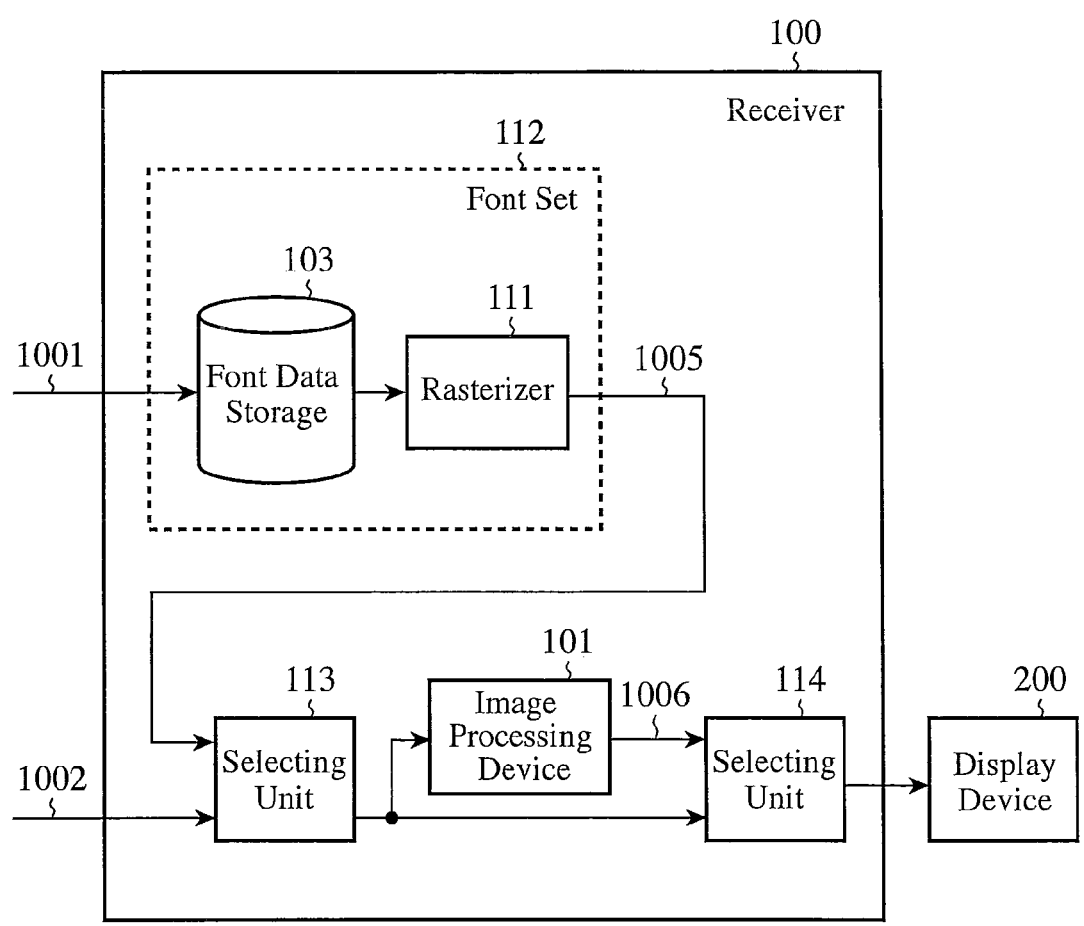
FIG. 19 is a configuration diagram showing a receiver in accordance with Embodiment 7 of the present invention.
Figure 20:
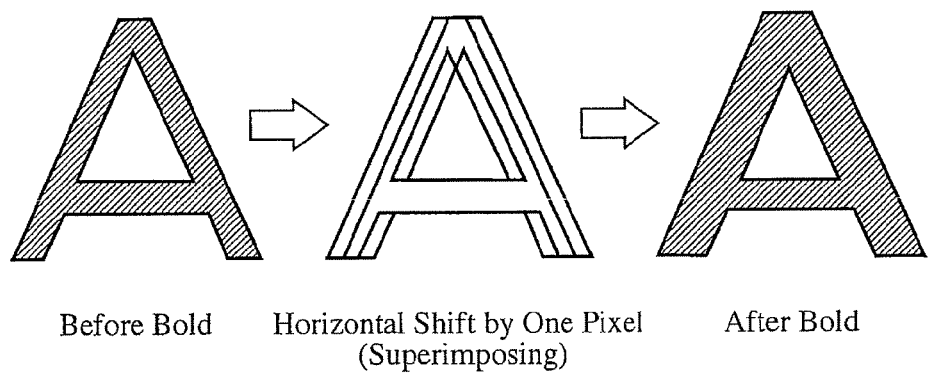
FIG. 20 is an explanatory drawing showing bold processing using superimposing.
Figure 21:
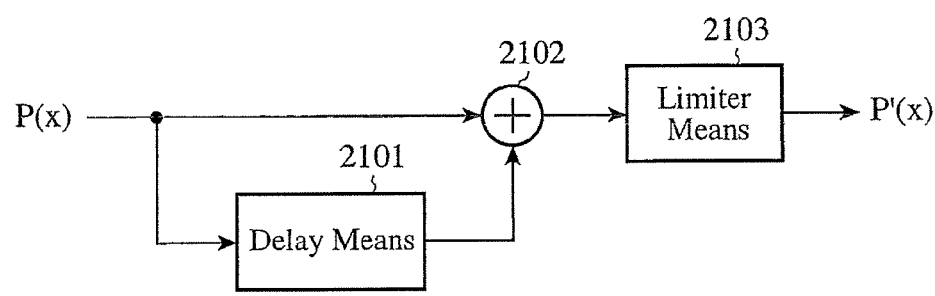
FIG. 21 is a configuration diagram showing a conventional image processing device.

FIG. 19 is a configuration diagram showing the receiver in accordance with Embodiment 7 of the present invention.

In the figure, the receiver 100 is provided with an image processing device 101, a font set 112 (a font data storage 103 and a rasterizer 111 not having any bold processing function), and selecting units 113 and 114.

In the receiver 100 shown in FIG. 19, when a character code 1001 is inputted, the font data storage 103 and the rasterizer 111 of the font set 112 generate a bitmapped image of an ordinary character 1005 of the character code.

The selecting unit 113 selects either the bitmapped image of the ordinary character 1005 of the character code, which is outputted from the rasterizer 111, or a bitmapped image of a custom character 1002.

The image processing device 101 in accordance with any of above-mentioned Embodiments 1 to 6 performs the bold processing on either the bitmapped image of the ordinary character 1005 of the character code or the bitmapped image of the custom character 1002, which is selected by the selecting unit 113.

The selecting unit 114 displays either the bitmapped image of the ordinary character 1005 of the character code or the bitmapped image of the custom character 1002, which is selected by the selecting unit 113, or a bitmapped image on which the bold processing is performed by the image processing device 101 on a display device 200.

Thus, the receiver has only to develop the character code which the rasterizer 111 has received to a bitmapped image, and to perform the subsequent bold processing using the bold processing done by the image processing device 101.

As a result, in addition to an advantage of implementing the bold processing based on the standardized algorithm, this Embodiment can offers an advantage of being able to reduce the bold processing functions which the receiver shown in FIG. 18 doubly has, thereby reducing the cost.

In this Embodiment 7, as an example of a system using the image processing device in accordance with either of above-mentioned Embodiments 1 to 6, the receiver of digital broadcasting is explained above, though the present Embodiment is not limited to this system and, for example, the image processing device can be applied to another system which displays a character image or a line drawing, such as a mobile phone or a car navigation system. This variant can provide the same advantages.

In those Embodiments 1 to 7, because P(x) is defined as a density value, it is assumed that P(x)=0 shows white and P(x)=Pmax shows black. In contrast, when P(x) is defined as a luminance value, because P(x)=0 is handled as black and P(x)=Pmax is handled as white, a conversion process of converting P(x) into Pmax−P(x) makes it possible to handle P(x) as if to handle a density value.

In above-mentioned Embodiments 1 to 7, as the components of the image processing device, some pieces of hardware, such as multipliers, delay elements, an adder, and a limiter, are used, as previously shown. In contrast, in a case in which the image processing device consists of a computer, an image processing program in which the descriptions of processes carried out by the components, such as multipliers, delay elements, an adder, and a limiter, are written can be stored in a memory of the computer, and a CPU of the computer can be made to execute the image processing program stored in the memory.

INDUSTRIAL APPLICABILITY

As mentioned above, the image processing device and the image processing program in accordance with the present invention are suitable for, for example, freely control of adjustment of the weight of a character in bold processing, thereby suppressing character deformations.

The invention claimed is:

1. An image processing device comprising:
   a first multiplication means for multiplying a pixel signal by a first weighting factor equal to or larger than 0 and equal to or smaller than 1;
   a delay means for delaying the pixel signal which has not been multiplied yet by the first weighting factor by said first multiplication means by a predetermined number of pixels;
   a second multiplication means for multiplying the pixel signal which has been delayed by said delay means by a second weighting factor equal to or larger than 0 and equal to or smaller than 1, a total sum of said first and second weighting factors being larger than 1 and smaller than an upper limit;
   an addition means for adding a result of the multiplication by said first multiplication means and a result of the multiplication by said second multiplication means; and
   a limit means for limiting a result of the addition by said addition means in such a way that the addition result falls within a maximum density value.

2. The image processing device according to claim 1, characterized in that the delay means delays the pixel signal by a predetermined number of lines of pixels.

3. An image processing device comprising:
   a first multiplication means for multiplying a pixel signal by a first weighting factor equal to or larger than 0 and equal to or smaller than 1;
   a first delay means for delaying the pixel signal which has not been multiplied yet by the first weighting factor by said first multiplication means by a predetermined number of pixels;
   a second delay means for delaying the pixel signal which has been delayed by said first delay means by a predetermined number of pixels;
   a second multiplication means for multiplying the pixel signal which has been delayed by said delay means by a second weighting factor equal to or larger than 0 and equal to or smaller than 1, a total sum of said first and second weighting factors being larger than 1 and smaller than an upper limit;
   a third multiplication means for multiplying the pixel signal which has been delayed by said second delay means by said first weighting factor;
   an addition means for adding a result of the multiplication by said first multiplication means, a result of the multiplication by said second multiplication means, and a result of the multiplication by said third multiplication means; and
   a limit means for limiting a result of the addition by said addition means in such a way that the addition result falls within a maximum density value.

4. The image processing device according to claim 3, characterized in that each of the first and second delay means delays the pixel signal by a predetermined number of lines of pixels.

5. An image processing device comprising:
   a first delay means for delaying a pixel signal by a predetermined number of pixels;
   a second delay means for delaying the pixel signal which has been delayed by said first delay means by a predetermined number of pixels;

a first multiplication means for multiplying the pixel signal which has been delayed by said first delay means by a first weighting factor equal to or larger than 0 and equal to or smaller than 1;

a second multiplication means for multiplying the pixel signal which has been delayed by said second delay means by a second weighting factor equal to or larger than 0 and equal to or smaller than 1, a total sum of said first and second weighting factors being larger than 1 and smaller than an upper limit;

an addition means for adding a result of the multiplication by said first multiplication means and a result of the multiplication by said second multiplication means;

a limit means for limiting a result of the addition by said addition means in such a way that the addition result falls within a maximum density value;

a deformation judging means for referring to the pixel signal which has not been delayed yet by said first delay means and the pixel signal which has been delayed by said first delay means to judge whether a deformation occurs in a pixel signal outputted from said limit means; and a selecting means for selecting the pixel signal outputted from said limit means when said deformation judging means judges that no deformation occurs in the pixel signal, and for selecting the pixel signal which has been delayed by said first delay means when said deformation judging means judges that a deformation occurs in the pixel signal outputted from said limit means.

6. The image processing device according to claim 5, characterized in that the deformation judging means judges that a deformation occurs in the pixel signal outputted from said limit means when the pixel signal which has been delayed by the first delay means does not have the maximum density value, the pixel signal which has not been delayed yet by said first delay means has the maximum density value, the pixel signal outputted from the limit means has the maximum density value, and the pixel signal which is the one outputted from said limit means and has been delayed by a predetermined number of pixels has the maximum density value.

7. An image processing device comprising:
a first delay means for delaying a pixel signal by a predetermined number of pixels;
a second delay means for delaying the pixel signal which has been delayed by said first delay means by a predetermined number of pixels;
a first multiplication means for multiplying the pixel signal which has been delayed by said first delay means by a first weighting factor equal to or larger than 0 and equal to or smaller than 1;
a second multiplication means for multiplying the pixel signal which has been delayed by said second delay means by a second weighting factor equal to or larger than 0 and equal to or smaller than 1, a total sum of said first and second weighting factors being larger than 1 and smaller than an upper limit;
an addition means for adding a result of the multiplication by said first multiplication means and a result of the multiplication by said second multiplication means;
a limit means for limiting a result of the addition by said addition means in such a way that the addition result falls within a maximum density value;
a deformation judging means for referring to the pixel signal which has not been delayed yet by said first delay means and the pixel signal which has been delayed by said first delay means to judge whether a deformation occurs in a pixel signal outputted from said limit means;
a deformation suppression pixel signal providing means for outputting a pixel signal for deformation suppression; and
a selecting means for selecting the pixel signal outputted from said limit means when said deformation judging means judges that no deformation occurs in the pixel signal, and for selecting the pixel signal outputted from said deformation suppression pixel signal providing means when said deformation judging means judges that a deformation occurs in the pixel signal outputted from said limit means.

8. The image processing device according to claim 7, characterized in that the deformation suppression pixel signal providing means outputs a pixel signal whose signal value is preset in such a way as to be smaller than the maximum density value.

9. The image processing device according to claim 7, characterized in that the deformation suppression pixel signal providing means implements a weighting average of a signal value of the pixel signal which has been delayed by the first delay means and the maximum density value, and outputs the weighting average.

10. An image processing device comprising:
a first delay means for delaying a pixel signal by a predetermined number of pixels;
a second delay means for delaying the pixel signal which has been delayed by said first delay means by a predetermined number of pixels;
a first multiplication means for multiplying the pixel signal which has been delayed by said first delay means by a first weighting factor;
a second multiplication means for multiplying the pixel signal which has been delayed by said second delay means by a second weighting factor;
an addition means for adding a result of the multiplication by said first multiplication means and a result of the multiplication by said second multiplication means; a limit means for limiting a result of the addition by said addition means in such a way that the addition result falls within a maximum density value;
a deformation judging means for referring to the pixel signal which has not been delayed yet by said first delay means and the pixel signal which has been delayed by said first delay means to judge whether a deformation occurs in a pixel signal outputted from said limit means; and
a weighting factor updating means for updating said first and second weighting factors according to a result of the judgment by said deformation judging means.

11. The image processing device according to claim 10, characterized in that when the deformation judging means judges that no deformation occurs in the pixel signal outputted from the limit means, the weighting factor updating means sets each of said first and second weighting factors to a value equal to or larger than 0 and equal to or smaller than 1 in such a way that a total sum of said first and second weighting factors is larger than 1 and smaller than an upper limit, whereas when the deformation judging means judges that a deformation occurs in the pixel signal outputted from the limit means, the weighting factor updating means sets each of said first and second weighting factors to a value equal to or larger than 0 and equal to or smaller than 1 in such a way that the total sum of said first and second weighting factors is smaller than 1.

12. The image processing device according to claim 10, characterized in that the deformation judging means judges that a deformation occurs in the pixel signal outputted from the limit means when the pixel signal which has been delayed by the first delay means does not have the maximum density value, the pixel signal which has not been delayed yet by said first delay means has the maximum density value, and the pixel signal which is the one outputted from the limit means and is delayed by a predetermined number of pixels has the maximum density value.

13. An image processing program for making a computer carry out:
- a first multiplying process step of multiplying a pixel signal by a first weighting factor equal to or larger than 0 and equal to or smaller than 1;
- a delaying process step of delaying the pixel signal which has not been multiplied yet by the first weighting factor in said first multiplication process step by a predetermined number of pixels;
- a second multiplying process step of multiplying the pixel signal which has been delayed in said delay process step by a second weighting factor equal to or larger than 0 and equal to or smaller than 1, a total sum of said first and second weighting factors being larger than 1 and smaller than an upper limit;
- an adding process step of adding a result of the multiplication in said first multiplying process step and a result of the multiplication in said second multiplying process step; and
- a limiting process step of limiting a result of the addition in said adding process step in such a way that the addition result falls within a maximum density value.

14. An image processing program for making a computer carry out:
- a first multiplying process step of multiplying a pixel signal by a first weighting factor equal to or larger than 0 and equal to or smaller than 1;
- a first delaying process step of delaying the pixel signal which has not been multiplied yet by the first weighting factor in said first multiplying process step by a predetermined number of pixels;
- a second delaying process step of delaying the pixel signal which has been delayed in said first delaying process step by a predetermined number of pixels;
- a second multiplying process step of multiplying the pixel signal which has been delayed in said first delaying process step by a second weighting factor equal to or larger than 0 and equal to or smaller than 1, a total sum of said first and second weighting factors being larger than 1 and smaller than an upper limit;
- a third multiplying process step of multiplying the pixel signal which has been delayed in said second delaying process step by said first weighting factor;
- an adding process step of adding a result of the multiplication in said first multiplying process step, a result of the multiplication in said second multiplying process step, and a result of the multiplication in said third multiplying process step; and
- a limiting process step of limiting a result of the addition in said addition process step in such a way that the addition result falls within a maximum density value.

15. An image processing program for making a computer carry out:
- a first delaying process step of delaying a pixel signal by a predetermined number of pixels;
- a second delaying process step of delaying the pixel signal which has been delayed in said first delaying process step by a predetermined number of pixels;
- a first multiplying process step of multiplying the pixel signal which has been delayed in said first delaying process step by a first weighting factor equal to or larger than 0 and equal to or smaller than 1;
- a second multiplying process step of multiplying the pixel signal which has been delayed in said second delaying process step by a second weighting factor equal to or larger than 0 and equal to or smaller than 1, a total sum of said first and second weighting factors being larger than 1 and smaller than an upper limit;
- an adding process step of adding a result of the multiplication in said first multiplying process step and a result of the multiplication in said second multiplying process step;
- a limiting process step of limiting a result of the addition in said adding process step in such a way that the addition result falls within a maximum density value;
- a deformation judging process step of referring to the pixel signal which has not been delayed yet in said first delaying process step and the pixel signal which has been delayed in said first delaying process step to judge whether a deformation occurs in a pixel signal outputted in said limiting process step; and
- a selecting process step of selecting the pixel signal outputted in said limiting process step when it is judged in said deformation judging process step that no deformation occurs in the pixel signal, whereas selecting the pixel signal which has been delayed in said first delaying process step when it is judged in said deformation judging process step that that a deformation occurs in the pixel signal outputted in said limiting process step.

16. An image processing program for making a computer carry out:
- a first delaying process step of delaying a pixel signal by a predetermined number of pixels;
- a second delaying process step of delaying the pixel signal which has been delayed in said first delaying process step by a predetermined number of pixels;
- a first multiplying process step of multiplying the pixel signal which has been delayed in said first delaying process step by a first weighting factor equal to or larger than 0 and equal to or smaller than 1;
- a second multiplying process step of multiplying the pixel signal which has been delayed in said second delaying process step by a second weighting factor equal to or larger than 0 and equal to or smaller than 1, a total sum of said first and second weighting factors being larger than 1 and smaller than an upper limit;
- an adding process step of adding a result of the multiplication in said first multiplying process step and a result of the multiplication in said second multiplying process step;
- a limiting process step of limiting a result of the addition in said adding process step in such a way that the addition result falls within a maximum density value;
- a deformation judging process step of referring to the pixel signal which has not been delayed yet in said first delaying process step and the pixel signal which has been delayed in said first delaying process step to judge whether a deformation occurs in a pixel signal outputted in said limiting process step;
- a deformation suppression pixel signal providing process step of outputting a pixel signal for deformation suppression; and
- a selecting process step of selecting the pixel signal outputted in said limiting process step when it is judged in said deformation judging process step that no deformation occurs in the pixel signal, whereas selecting the pixel signal outputted in the deformation suppression pixel signal providing process step when it is judged in said deformation judging process step that a deformation occurs in the pixel signal outputted in said limiting process step.

17. A non-transitory computer readable medium having store thereon an image processing program for making a computer carry out:
- a first delaying process step of delaying a pixel signal by a predetermined number of pixels;
- a second delaying process step of delaying the pixel signal which has been delayed in said first delaying process step by a predetermined number of pixels;
- a first multiplying process step of multiplying the pixel signal which has been delayed in said first delaying process step by a first weighting factor;
- a second multiplying process step of multiplying the pixel signal which has been delayed in said second delaying process step by a second weighting factor;
- an adding process step of adding a result of the multiplication in said first multiplying process step and a result of the multiplication in said second multiplying process step;
- a limiting process step of limiting a result of the addition in said adding process step in such a way that the addition result falls within a maximum density value;
- a deformation judging process step of referring to the pixel signal which has not been delayed yet in said first delaying process step and the pixel signal which has been delayed in said first delaying process step to judge whether a deformation occurs in a pixel signal outputted in said limiting process step; and
- a weighting factor updating process step of updating said first and second weighting factors according to a result of the judgment in said deformation judging process step.

* * * * *